US009262696B2

(12) United States Patent
Ratcliff et al.

(10) Patent No.: US 9,262,696 B2
(45) Date of Patent: Feb. 16, 2016

(54) IMAGE CAPTURE FEEDBACK

(71) Applicant: INTEL CORPORATION, Santa Clara, CA (US)

(72) Inventors: Joshua J. Ratcliff, San Jose, CA (US); Ronald T. Azuma, San Jose, CA (US); Yan Xu, Santa Clara, CA (US); Gheric Speiginer, Atlanta, GA (US)

(73) Assignee: INTEL CORPORATION, Santa Clara, CA (US)

( * ) Notice: Subject to any disclaimer, the term of this patent is extended or adjusted under 35 U.S.C. 154(b) by 68 days.

(21) Appl. No.: 14/127,952

(22) PCT Filed: Oct. 30, 2013

(86) PCT No.: PCT/US2013/067548
§ 371 (c)(1),
(2) Date: Dec. 19, 2013

(87) PCT Pub. No.: WO2015/065386
PCT Pub. Date: May 7, 2015

(65) Prior Publication Data
US 2015/0178592 A1 Jun. 25, 2015

(51) Int. Cl.
G06K 9/62 (2006.01)
G06T 7/00 (2006.01)
H04N 5/232 (2006.01)
(Continued)

(52) U.S. Cl.
CPC ............. *G06K 9/627* (2013.01); *G06K 9/4671* (2013.01); *G06T 7/00* (2013.01); *G06T 7/0051* (2013.01); *G06T 7/606* (2013.01); *H04N 5/232* (2013.01); *H04N 5/23293* (2013.01); *G06T 2207/10016* (2013.01); *G06T 2207/10024* (2013.01);
(Continued)

(58) Field of Classification Search
CPC ..... G06K 9/66; G06K 9/6255; G02C 13/001; G06F 19/3456; G06F 17/50
USPC .................. 382/155, 128, 100, 275; 351/178; 700/98
See application file for complete search history.

(56) References Cited

U.S. PATENT DOCUMENTS 8,724,857 B2 * 5/2014 Derakhshani et al. ........ 382/117
2008/0122944 A1 5/2008 Zhang
(Continued)

FOREIGN PATENT DOCUMENTS

JP 2007-129480 A 5/2007
JP 2007-158868 A 6/2007
(Continued)

OTHER PUBLICATIONS

Tomita, an English machine translation of JP2007-158868, 2007.*
(Continued)

Primary Examiner — Ruiping Li
(74) Attorney, Agent, or Firm — Schwabe, Williamson & Wyatt, P.C.

(57) ABSTRACT

Embodiments for image capture feedback are disclosed. In some embodiments, a computing system may receive a first image from an image capture device and generate a score for the first image. The computing system may generate a recommendation for an action, such that if the image capture device captures a second image after the action is performed, the score for the second image will be better than the score for the first image. The computing system may indicate the recommended action to the user on an output device. Other embodiments may be disclosed and/or claimed.

20 Claims, 12 Drawing Sheets

(51) Int. Cl.
*G06K 9/46* (2006.01)
*G06T 7/60* (2006.01)

(52) U.S. Cl.
CPC ............. *G06T2207/10028* (2013.01); *G06T 2207/30168* (2013.01)

(56) References Cited

U.S. PATENT DOCUMENTS

2012/0106850 A1  5/2012  Koch et al.
2015/0055086 A1* 2/2015  Fonte et al. .................. 351/178

FOREIGN PATENT DOCUMENTS

JP  2007-259035 A  10/2007
KR  10-2009-0067915 A  6/2009

OTHER PUBLICATIONS

International Search Report and Written Opinion mailed Jul. 28, 2014 for International Application No. PCT/US2013/067548, 9 pages.
Pedro,J.S.,& Church,K., "The sound of light:induced synesthesia for augmenting the photography experience." CHI'13 Extended Abstracts on Human Factors in Computing Systems(pp. 745-750). ACM.
Visual Attention—Theory, 2000, the University of Southern California, 5 pages.
http://www.ics.uci.edu/~xzhu/paper/face-cvpr12.pdf on Oct. 3, 2013—Zhu, Xiangxin et al, "Face Detection, Pose Estimation, and Landmark Localization in the Wild", Computer Vision and Pattern Recognition (CVPR) Providence, Rhode Island, Jun. 2012, 8 pages.
U.S. Appl. No. 13/710,312, filed Dec. 10, 2012, 91 pages.

* cited by examiner

IMAGE CAPTURE FEEDBACK

CROSS REFERENCE TO RELATED APPLICATION

The present application is a national phase entry under 35 U.S.C. §371 of International Application No. PCT/US2013/067548, filed Oct. 30, 2013, entitled "IMAGE CAPTURE FEEDBACK," which designated, among the various States, the United States of America, and which is hereby incorporated by reference.

TECHNICAL FIELD

The present disclosure relates generally to the field of image capture, and more particularly, to image capture feedback.

BACKGROUND

Skilled photographers bring a great deal of training and expertise to bear on how they select, compose, and capture images. Most owners of image capture devices (ICDs), such as still and video cameras, are not skilled photographers. To compensate, some existing devices allow a user to edit an image after it is captured (e.g., by adjusting the brightness or color properties, cropping the image, airbrushing portions of the image, etc.). However, the successful use of such editing techniques requires training and skill, and may be nearly as or more difficult than developing good photographic techniques. Thus, despite the proliferation of ICDs, high quality images are still rare.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
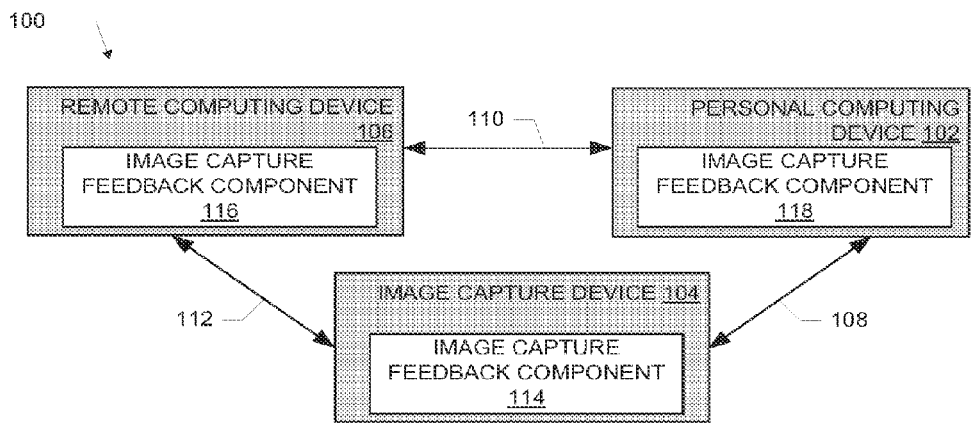
FIG. 1 is a block diagram of an illustrative computing system configured for image capture feedback, in accordance with various embodiments.

Embodiments for image capture feedback are disclosed. In some embodiments, a computing system may receive a first image from an image capture device (ICD) and generate a score for the first image. The computing system may generate a recommendation for an action, such that if the ICD captures a second image after the action is performed, the score for the second image will be better than the score for the first image. The computing system may indicate the recommended action to the user on an output device.

At best, some existing ICDs provide static guidance to a user, typically a fixed grid superimposed over the field of view to which the user may choose to align various objects in a scene. However, casual users may have no idea what such static guidance is for, nor how to use it to improve an image. Moreover, such static guidance may only aid an experienced user in aligning various objects in the scene, but provides no assistance with any of the hundreds of other variables that may affect the quality of an image, such as ICD settings, lighting, color, focus, depth-of-field, simplicity, etc.

Various ones of the embodiments disclosed herein may improve on existing image capture techniques and systems by providing dynamic guidance about ways to improve an image while a user is attempting to capture a scene. In particular, the image capture feedback techniques and systems described herein may analyze an image from an ICD, and generate a recommendation for an action to improve the image. The recommended action may be an action by the user (e.g., moving the ICD to another position or changing a setting on the ICD) or an action by one or more objects in the image (e.g., asking a person in the image to move to the left or right). The techniques and systems may then analyze a new image (e.g., after the recommended action or another action has been taken) and provide further recommendations as suitable.

Some such embodiments may provide near-instantaneous feedback to the user so that the user can improve the image without taking her eyes and attention off the scene, or having to put down the ICD in order to consult a manual or other documentation, or having an expert photographer sharing the viewfinder. Some such embodiments are customizable based on a user's level of photographic expertise. For example, in some embodiments, more automated guidance (e.g., the automatic selection of a composition template) may be provided to users who have indicated that they are novices. In some embodiments, only expressly selected guidance (e.g., the application of a user-selected composition template) may be provided to users who have indicated that they only desire such expressly selected guidance. Many other embodiments of image capture feedback systems, and the advantages that may be associated with such embodiments, are disclosed herein.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description uses the phrases "in an embodiment," or "in embodiments," which may each refer to one or more of the same or different embodiments. Furthermore, the terms "comprising," "including," "having," and the like, as used with respect to embodiments of the present disclosure, are synonymous. As used herein, the phrase "coupled" may mean that two or more elements are in direct physical or electrical contact, or that two or more elements are not in direct contact with each other, but yet still cooperate or interact with each other (e.g., via one or more intermediate elements, which may perform their own transformations or have their own effects). For example, two elements may be coupled to each other when both elements communicate with a common element (e.g., a memory device). As used herein, the term "logic" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

FIG. 1 depicts an illustrative computing system 100 configured for image capture feedback, in accordance with various embodiments. In some embodiments, the computing system 100 may be configured to receive an image from an ICD; generate a score for the image; generate a recommendation for an action, such that if the ICD captures a second image after the action is performed, the score for the second image will be better than the score for the image, e.g., the score for the second image being higher; and indicate the recommended action to the user on an output device. Several examples of the distribution of operations between the components of the computing system 100 are discussed herein, but any other combination of more or less components and distribution of the operations may be used. In some embodiments, the computing system 100 may be configured as the image capture feedback system 200, discussed below with reference to FIG. 2.

The computing system 100 may include a personal computing device 102, an ICD 104, and a remote computing device 106. Each of the personal computing device 102, the ICD 104, and the remote computing device 106 may include image capture feedback components (illustrated in FIG. 1 as the image capture feedback components 118, 116 and 114, respectively). Image capture feedback and other operations may be distributed between the image capture feedback components 114, 116 and 118 of the computing system 100 as suitable. Several examples of the distribution of image capture feedback operations between the personal computing device 102, the ICD 104 and the remote computing device 106 are discussed herein, but any other combination of more or fewer components, and any other distribution of the operations, may be used. For example, in some embodiments, one or more of the image capture feedback components 114, 116 and 118 may be omitted, and all suitable image capture feedback operations (e.g., any of those described herein) may be performed by the remaining image capture feedback component(s). Except for the image capture feedback teachings of the present disclosure incorporated therein, the personal computing device 102, the ICD 104 and the remote computing device 106 may be a broad range of such devices known in the art. Specific, but not limiting, examples are described herein.

Communication between the components of the computing system 100 may be enabled by the communication pathways 108, 110 and 112. The communication pathways 108, 110 and 112 may each include wired communication pathways and/or wireless communication pathways, over direct couplings, and/or over personal, local and/or wide area networks. Each of the personal computing device 102, the ICD 104 and the remote computing device 106 may include suitable hardware for supporting the communication pathways 108, 110 and 112, such as network interface cards, modems, WiFi devices, Bluetooth devices, and so forth. In some embodiments, the communication pathways 108, 110 and 112 may be direct communication pathways between the components as illustrated in FIG. 1. As used herein, references to "direct" communication pathways between two components of the computing system 100 of FIG. 1 (or any system or device disclosed herein) may refer to a communication pathway that does not route through another illustrated component, but that may route through other non-illustrated devices (e.g., routers and/or switches).

Each of the devices included in the computing system 100 may include a processing device and a storage device (not shown). The processing device may include one or more processing devices, such as one or more processing cores, ASICs, electronic circuits, processors (shared, dedicated, or group), combinational logic circuits, and/or other suitable components that may be configured to process electronic data. The storage device may include any suitable memory or mass storage devices (such as solid-state drive, diskette, hard drive, compact disc read only memory (CD-ROM) and so forth). Each of the computing devices included in the computing system 100 may include one or more buses (and bus bridges, if suitable) to communicatively couple the processing device, the storage device, and any other devices included in the respective computing devices. The storage device may include a set of computational logic, which may include one or more copies of computer readable media having instructions stored therein which, when executed by the processing device of the computing device, may cause the computing device to implement any of the techniques disclosed herein, or any portion thereof. In some embodiments, the computational logic may include any of the logic discussed below with reference to FIG. 2.

The personal computing device 102 may be a computing device that is integrated into a garment, accessory or other support structure that is configured to be worn on the body of the user (or "wearer"). Examples of suitable support structures for a wearable personal computing device 102 may include glasses, a headset, a hair accessory (e.g., a headband or barrette), an ear piece, jewelry (e.g., brooch, earrings or a necklace), a wrist band (e.g., a wristwatch), a neck band (e.g., a tie or scarf), a garment (e.g., a shirt, pants, dress skirt or jacket), shoes, a lanyard or nametag, a contact lens, or an implantable support structure, among others. In some embodiments, the personal computing device 102 may be a wrist-mounted computing device having a camera (which may serve as the image capture device 104) and a microphone. In some embodiments, the personal computing device 102 may be a glasses-mounted computing device having a camera (which may serve as the image capture device 104) and a microphone.

The personal computing device 102 may be a desktop or stand-alone computing device, or a computing device configured for carrying in a pocket, backpack or other carrying case, and for operation with one or more of a user's hands. Examples of computing devices that may serve as the personal computing device 102 include cellular phones, smartphones, other handheld mobile communication devices, tablets, electronic book readers, personal digital assistants, laptops, or other such computing devices. Although the personal computing device 102 (and other components described herein) may be referred to in the singular, any number of personal computing devices may be included in the personal computing device 102 (and similarly, any component may include multiple such components).

Image capture feedback and other operations performed by the personal computing device 102 may be controlled by an app or plug-in on the personal computing device 102, for example. In some embodiments, the personal computing device 102 may include two or more computing devices, one of which has more computing resources (e.g., processing power, memory, and/or communication bandwidth) than another. For example, the personal computing device 102 may include a larger tablet computing device and a smaller wrist- or glasses-mounted computing device. In such embodiments, data captured and preliminarily processed by the smaller computing device (e.g., image, audio, or other sensor data) may be transmitted from the smaller computing device to the larger computing device for further processing.

The computing system 100 may include an ICD 104. In some embodiments, the ICD 104 may include one or more cameras. As used herein, the term "camera" may include still image cameras and video cameras. A camera may be analog or digital. In some embodiments, the ICD 104 may capture high-definition video. In some embodiments, the ICD 104 may be configured to stream image data (e.g., video data) to the personal computing device 102 and/or the remote computing device 106 via a wired or wireless communication pathway (e.g., the pathways 108 and 112, respectively). In some embodiments, the ICD 104 may be connected locally to (or integrated with) the personal computing device 102, while in other embodiments, the ICD 104 may be remote from the personal computing device 102 (and, for example, may be integrated with a personal computing device associated with a different owner or user than the owner or user of the personal computing device 102).

The ICD 104 may use any imaging wavelength (e.g., visible or infrared light). In some embodiments, the ICD 104 may include a visible light camera and an infrared camera, and may combine the images captured by these devices or treat them separately. In some embodiments, the ICD 104 may be configured to capture a fixed number of still images sequentially, and may alert the user prior to capturing each image with a sound or other indicator.

The ICD 104 may include multiple ICDs, each associated with a different user of the computing system 100. For example, each user of a social networking service (running on the computing system 100) may have an image capture device (e.g., configured similar to the ICD 104) integrated into the user's smartphone or tablet (e.g., configured similar to the personal computing device 102), and may provide captured images to the remote computing device 106 for processing, as discussed below. In another example, the ICD 104 may include an array camera, in which multiple lenses enable simultaneous capture of multiple images of the same subject. Each image captured by an array camera may vary by exposure time, focal distance, white balance, etc. The ICD 104 may include a processing device which is configured to execute any known technique for combining the images or provide various image browsing experiences (e.g., in conjunction with other components of the computing system 100).

In some embodiments, the ICD 104 may include a depth camera. A depth camera may include a heterogeneous array of cameras (e.g., having different resolutions, optical properties and/or other characteristics), and may provide information about the depth of objects in a captured scene. In some embodiments, a depth camera may include two or more cameras arranged to provide stereo or multi-baseline stereo. In some such embodiments, features (e.g., elements in the captured scene) may be recognized in each camera, and correspondences between recognized features may be analyzed to determine the depths of the features. In some embodiments, a depth camera may include a camera and a projector that shines structured or striped light of particular patterns into the scene. The known geometry of the structured light, combined with observation by the camera of that pattern in the scene, may enable the depth camera to determine depth information. In some embodiments, a depth camera may include multiple cameras and a projector that projects a random texture pattern into the scene. The texture points in the captured scene may become features which may be analyzed by the multiple cameras to identify correspondences that enable the estimation of depth. In some embodiments, a depth camera may utilize a time-of-flight approach in which a signal is emitted and the time it takes for the signal to return is measured. Such depth camera may use ultrasonic, laser and other sensors. In some embodiments, a depth camera may be configured to recognize objects of known physical dimension in a scene and may estimate depth for those objects by observing the size of those objects in the captured image.

The computing system 100 may be configured to generate a model of a scene having one or more features at various depths within the scene based on the data generated by a depth camera. Examples of features that may be generated using data from a depth camera include the "mass" of objects at a particular depth and the "center-of-mass" of all objects at a particular depth, as discussed below.

The remote computing device 106 may include one or more servers (e.g., arranged in a "cloud" computing configuration) or other computing devices remote from the personal computing device 102 and/or the ICD 104. The communication pathway 110 between the personal computing device 102 and the remote computing device 106, and communication pathway 112 between the image capture device 104 and the remote computing device 106, may be configured according to any remote wired or wireless communication protocol. In some embodiments, the remote computing device 106 may have more computing resources (e.g., processing power, memory, and/or communication bandwidth) than the personal computing device 102 or the ICD 104. Thus, in some embodiments, data captured and preliminarily processed by the personal computing device 102 and/or the image capture device 104 (e.g., image data, such as a model for an image) may be transmitted over the communication pathways 110 and/or 112 to the remote computing device 106 for further processing. In some embodiments, the remote computing device 106 may perform most of the image capture feedback operations discussed below with reference to FIG. 2. In some embodiments, the remote computing device 106 may include a storage device for storing images captured by the ICD 104.

As indicated above, in some embodiments, the remote computing device 106 may communicate with a plurality of personal computing devices (configured similarly to the personal computing device 102) and/or a plurality of ICDs (configured similarly to the ICD 104). The remote computing device 106 may perform similar processing and storage operations for each personal computing device or ICD. For example, the remote computing device 106 may receive images captured by a plurality of image capture devices (configured similarly to the image capture device 104) and may perform image capture feedback with respect to these images (e.g., generating recommendations for different actions to be indicated to each of the different users of the different ICDs). The remote computing device 106 may devote different resources to different ones of the plurality of personal computing devices or ICDs in communication with the remote computing device 106 (e.g., different memory partitions or databases for each device).

In some embodiments of the image capture feedback systems disclosed herein, one or more of the communication pathways between components of the computing system 100 may not be included. For example, in some embodiments, the ICD 104 may not communicate directly with the remote computing device 106 via the communication pathway 112, but may communicate with the remote computing device 106 via the personal computing device 102 and the communication pathways 108 and 110.

As noted above, various of the image capture feedback operations described below may be distributed in any desired arrangement among the components of the computing system 100. For example, in some embodiments, all of the image capture feedback operations described herein may be performed by the ICD 104. In some embodiments, many of the image capture feedback operations described herein may be performed by the ICD 104, while other image capture feedback operations may be performed by the remote computing device 106 (which may be, for example, a cloud computing device). In some embodiments, some or all of the image capture feedback operations described herein may be performed by the personal computing device 102 (which may be, for example, a wearable computing device). Any other arrangement may be employed, as desired.

Figure 2:
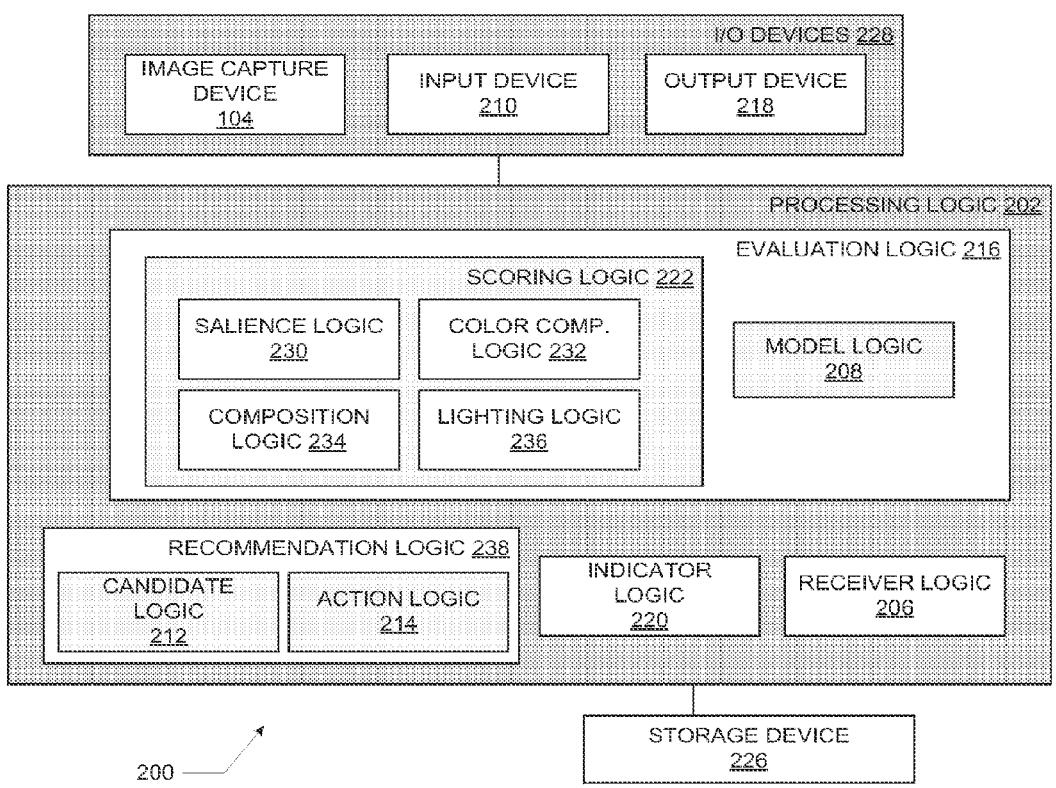
FIG. 2 is a block diagram of an illustrative image capture feedback system that may be implemented by the computing system of FIG. 1, in accordance with various embodiments.

FIG. 2 is a block diagram of an illustrative image capture feedback system 200, in accordance with various embodiments. The image capture feedback system 200 may include input/output (I/O) devices 228, processing logic 202, and a storage device 226. The image capture feedback system 200 may be configured to perform any of a number of image capture feedback operations. For example, the image capture feedback system 200 may be configured to receive an image from an ICD; generate a score for the image; generate a recommendation for an action, such that if the ICD captures a second image after the action is performed, the score for the second image will be better than the score for the image; and indicate the recommended action to the user on an output device.

The image capture feedback system 200 may be implemented by the computing system 100 of FIG. 1, in accordance with various embodiments. In particular, the components of the image capture feedback system 200 may be distributed in any suitable manner among one or more of the components of the computing system 100. Although a number of components of the image capture feedback system 200 are illustrated in FIG. 2, various embodiments may omit components as appropriate for the image capture feedback operations to be performed. For example, some embodiments of the image capture feedback system 200 may not be configured for lighting analysis, and thus may not include the lighting logic 236.

The I/O devices 228 of the image processing system 200 may include the ICD 104. The ICD 104 may take any of the forms discussed above with reference to FIG. 1. For example, the ICD 104 may be included in the personal computing device 102 (FIG. 1), which may stream image data (e.g., the image and/or a model associated with the image) wirelessly to the remote computing device 106 via the communication pathway 110.

The I/O devices 228 may include an input device 210. Although the input device 210 may be referred to in the singular, the input device 210 may include multiple input devices, each operating according to one or more input modalities. The input device 210 may be configured to receive a touch input, a voice input, or a gesture input, for example, and convert that input into one or more electrical signals that may be communicated to other components of the image capture feedback system 200. The input device 210 may include an audio capture device (e.g., one or more microphones arranged in various orientations), a keyboard, a cursor control device such as a mouse, a stylus, a touchpad, a bar code reader, a Quick Response (OR) code reader, an radio frequency identification (RFID) reader, a Global Positioning System (GPS) receiver, a short-range wireless receiver (e.g., a Bluetooth receiver), one or more sensors (e.g., an accelerometer or a motion detector), or any other suitable input device.

The image capture feedback system 200 may include an output device 218. As discussed above with reference to the input device 210, although the output device 218 may be referred to in the singular, any number of output devices may be included in the output device 218. In some embodiments, the output device 218 may include an image output device, such as a visual display or projector. The output device 218 may include one or more heads-up displays (i.e., displays including a projector arranged in an optical collimator configuration and a combiner to provide data without requiring a user to look away from his or her typical viewpoint), computer monitors, projectors, touchscreen displays, liquid crystal displays (LCDs), light-emitting diode displays or flat panel displays, for example. In some embodiments, the output device 218 may be a display included in the ICD 104. A display included in the ICD 104 may display a scene currently or previously captured by the ICD 104, and/or other information. In some embodiments, the output device 218 may be a touchscreen included in a personal computing device 102 (e.g., a smartphone) that also includes the ICD 104. In some embodiments, the output device 218 may include an audio output device, such as one or more speakers or other audio transducers which may be, for example, mounted in one or more earphones or earbuds. Other devices that may be included in the output device 218 include 2-D or 3-D printers, wired or wireless transmitters for providing information to other devices, additional storage devices, haptic devices such as vibration devices, or any suitable output device.

The image capture feedback system 200 may include a storage device 226. In some embodiments, the storage device 226 may include one or more databases or other data storage structures for storing any of the data described herein for access by any of the components of the image capture feedback system 200 (e.g., image data, model data, scoring metrics, the results of intermediate and/or final calculations, image scores, etc.). The storage device 226 may include any memory device, such as one or more hard drives, solid state logic, or portable storage media, for example. The storage device 226 may be local to any one or more of the components of the processing logic 202 and/or the I/O devices 228, or remote from any component. The storage device 226 may include both local and remote components. The storage device 226 may include a plurality of different storage devices, which may be of different storage types (e.g., a hard drive and a portable storage device, for example).

The I/O devices 228 and the storage device 226 may be coupled to the processing logic 202. The processing logic 202 may include an input device interface (not shown) configured to receive data to and/or from one or more of the I/O devices 228 and route this data between the I/O devices 228 and one or more of the components of the processing logic 202. The processing logic 202 may include a storage device interface (not shown) configured to receive data to and/or from the storage device 226 and route this data between the storage device 226 and one or more of the components of the processing logic 202. Although the components of the processing logic 202 are illustrated separately, the components may be combined or divided as suitable, and each may use one or more of the results generated by others in performing its own analysis. Data may be communicated between the components of the processing logic 202 over a physical bus, a long-distance wired communication pathway, a short- or long-distance wireless communication pathway, or any combination of communication pathways.

The processing logic 202 may include receiver logic 206. In some embodiments, the receiver logic 206 may be configured to receive images from the ICD 104. These images may be received directly from the ICD 104, or may be accessed from a memory (e.g., included in the storage device 226). If the images are not already stored, the receiver logic 206 may provide the images for storage in the storage device 226. The operation of receiving an image (and indicating a recommended action based on the image) may be iterated with new images captured at periodic or non-periodic intervals (e.g., in response to detection of motion of the ICD 104 by an accelerometer or other sensor included in the input device 210).

Figure 3:
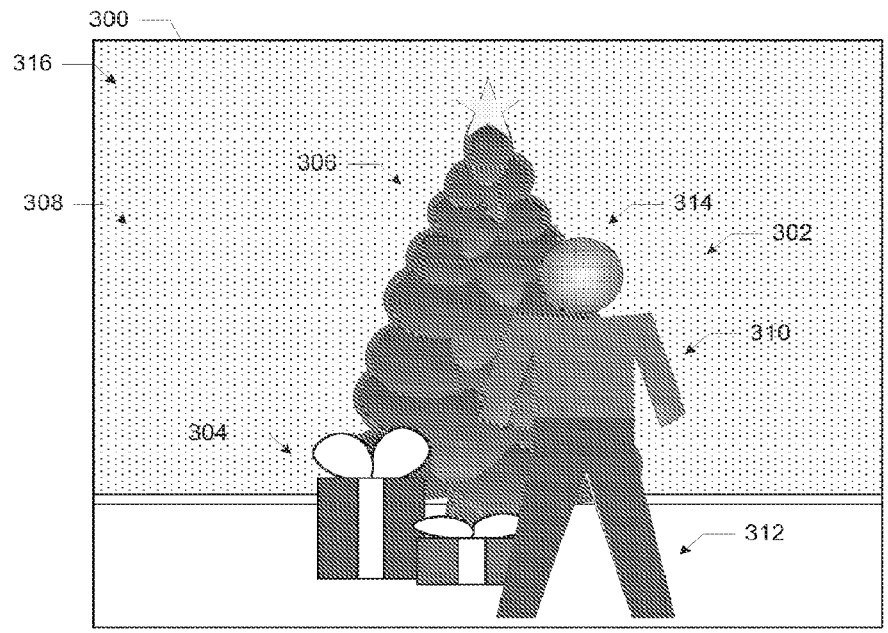
FIG. 3 depicts an illustrative image of a scene that may be processed to provide image capture feedback by the image capture feedback system of FIG. 2, in accordance with various embodiments.

The image received by the receiver logic 206 may capture a scene of interest to a user of the image capture feedback system 200. For example, FIG. 3 depicts an illustrative image 300 of a scene 316 that may be received by the receiver logic 206 and processed by one or more other components of the image capture feedback system 200, as discussed below. The image 300 may capture a number of objects in the scene 316, such as a person 302 (having a head 314, a shirt 310, and pants 312), several presents 304, a tree 306, and a room 308.

Returning to FIG. 2, the processing logic 202 may include evaluation logic 216. The evaluation logic 216 may be coupled to the receiver logic 206, and may be configured to generate a score for the image. The evaluation logic 216 may generate a score for the image automatically as the image is received by the receiver logic 206, or in response to a user request for guidance (e.g., by pressing a help button in a user interface, not shown). In some embodiments, the evaluation logic 216 may generate a score by applying a scoring metric representative of the quality of the image in accordance with one or more aesthetic criteria. Many examples of scoring metrics are described herein, and any suitable scoring metric may be implemented by the evaluation logic 216. For example, in some embodiments, the evaluation logic 216 may generate a score by applying the following scoring metric:

$$\text{score (image)} = \begin{cases} 1 & \text{thresh} < \text{argmax}(\textit{hist}(\text{image, thresh: 1})) < 1 \\ 0 & \text{otherwise} \end{cases} \quad (1)$$

where hist(image, a:b) indicates the histogram of the tonal values of the image between tonal values a and b, with a tonal value of 1 indicating a white pixel and a tonal value of 0 indicating a black pixel; argmax(h) is a function that returns the argument to h that yields the maximum value of h, and thresh represents a predetermined threshold value near 1, which may be selected in any suitable manner for various applications. The scoring metric of Eq. 1 may "reward" an image by giving it a score of 1 when it is not overexposed (e.g., when argmax(hist(thresh:1))<1) or underexposed (e.g., when argmax(hist(thresh:1))>thresh), and "penalize" an image by giving it a score of 0 otherwise. The scoring metric of Eq. 1 is simply illustrative of a score generation technique that may be implemented by the evaluation logic 216. Many additional and alternative examples of score generation techniques are described herein.

In some embodiments, the evaluation logic 216 may include model logic 208 and scoring logic 222. The model logic 208 may be coupled to the receiver logic 206, and may be configured to process an image received by the receiver logic 206 to generate a model representative of the image. The evaluation logic 216 may also be coupled to the recommendation logic 208 and may be configured to generate a score for a candidate or target image (e.g., via a candidate or target model), as discussed below. The scoring logic 222 may be coupled with the model logic 208, and may be configured to apply a scoring metric to a model generated by the model logic 208 to generate the score for the image. In some embodiments, the model logic 208 may perform any processing task that generates data representative of the content of the image, and the scoring logic 222 may use the data generated by the model logic 208 to generate the score for the image. For example, in embodiments in which the evaluation logic 216 generates a score for an image using the scoring metric of Eq. 1, the model logic 208 may process the image to generate the histogram of the tonal values of the image (the model), and the scoring logic may generate the score for the image by applying the scoring metric of Eq. 1 to the histogram.

The model logic 208 may generate a model of an image in any suitable number of dimensions, and may include any suitable level of detail in the model regarding the objects in the scene and the ICD 104 used to capture the scene. In some embodiments, the model may be two-, three-, or four-dimensional. For example, if the image is a video stream having no spatial depth information, the model logic 208 may generate a three-dimensional model having two spatial dimensions and one temporal dimension. If the image is a still image captured by a depth camera, the model logic 208 may generate a three-dimensional model having three spatial dimensions. Even in an embodiment in which the image does not include depth information, the ICD 104 may have zoom capabilities, so the model generated by the model logic 208 may include a third spatial (depth) dimension to account for the zoom capability; alternatively, the model logic 208 may treat the zoom capability as a setting of the ICD 104, and thus may not include a third spatial dimension in the model. The dimensions of the model may be based on a number of factors, such as the number of spatial and/or temporal dimensions resolvable from the image received by the receiver logic 206 and the processing resources available to evaluate the model (with more dimensions requiring more resources to perform the image capture feedback techniques described herein in a suitable amount of time).

Figure 4:
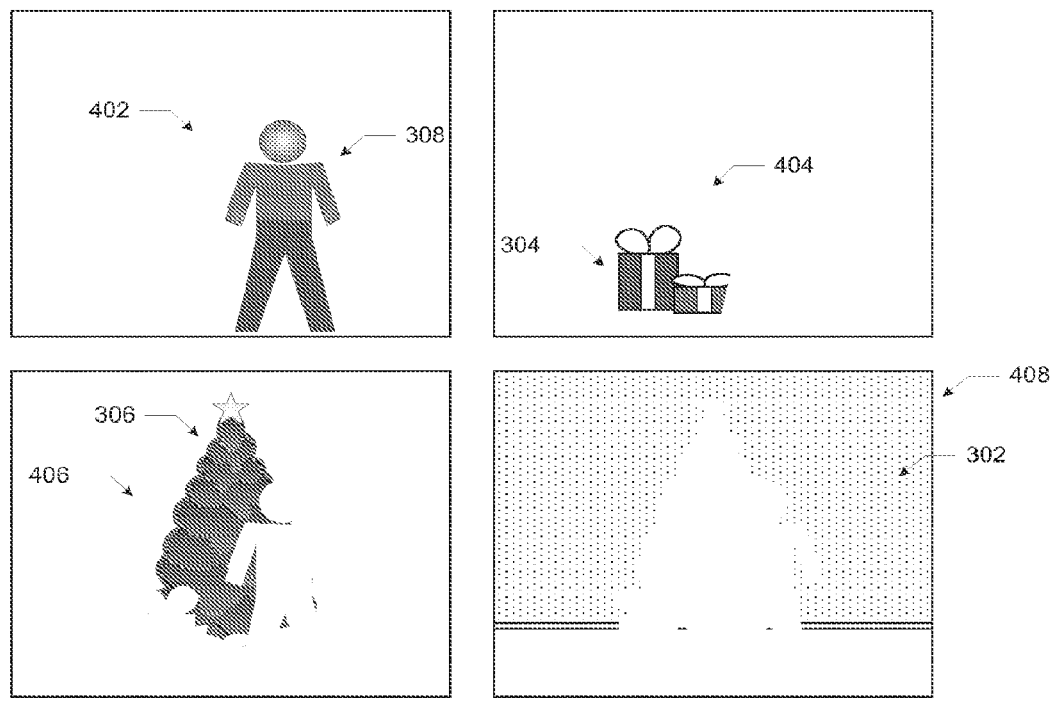
FIG. 4 illustrates various regions in the image of FIG. 3, as generated by the image capture feedback system of FIG. 2, in accordance with various embodiments.

The model logic 208 may generate any of a number of different kinds of information from an image. For example, the model logic 208 may generate one or more regions of the image. A region may be associated with a particular range of depth in the image, and may include objects in the captured scene falling in or approximately in that range of depth. In some embodiments, the image may be captured by a depth camera, and one or more regions may be generated by segmenting the image into regions corresponding to different depths. For example, FIG. 4 depicts four regions 402, 404, 406 and 408 generated by the model logic 208 for the image 300 (FIG. 3). Each region is associated with one or more objects in the scene 316. In FIG. 4, the region 402 includes the person 302, the region 404 includes the presents 304 (located at a greater depth in the image than the person 302), the region 406 includes the tree 306 (located at a greater depth in the image than the presents 304), and the region 408 includes the room 308 (located at a greater depth in the image than the tree 306). A region may be associated with a location in any of a number of ways, including using the center of the region or the boundary of the region, for example.

Figure 5:
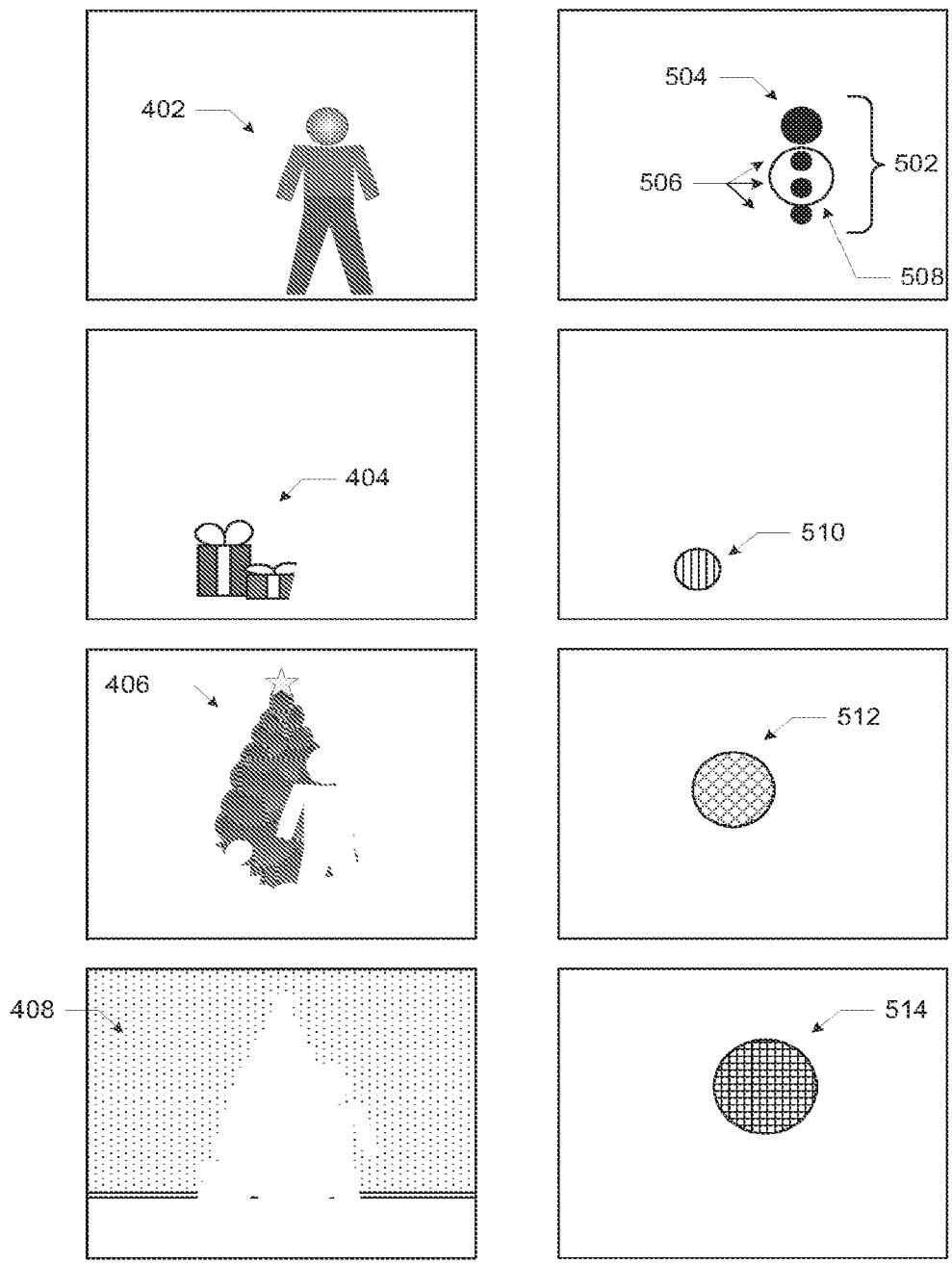
FIG. 5 illustrates features included in a model of the image of FIG. 3, as generated by the image capture feedback system of FIG. 2, in accordance with various embodiments.

In some embodiments, the model generated by the model logic 208 may include one or more features of the image. As used herein, a "feature" of the image may include any coherent point, area, or collection of points or areas of the image, and may be associated with one or more corresponding locations in the image. In particular, a feature may correspond to an object in the scene captured by the image, and may be associated with a location of the corresponding object. The location of a feature may be represented using a coordinate system keyed to the image (e.g., with an origin at one corner of the image and with distance measured in pixels) or some other coordinate and/or distance system (e.g., with an origin located at a point in the scene and with distance measured in meters within the scene). The model logic 208 may generate any of a number of different features in the model. In some embodiments, features may be included in or associated with particular regions or other features. Such an embodiment is illustrated in FIG. 5, which depicts additional features generated by the model logic 208 for each of the regions 402, 404, 406 and 408 of FIG. 4 (reproduced on the left hand side of FIG. 5 for convenience). A number of embodiments of features are now discussed with reference to FIG. 5.

In some embodiments, the model logic 208 may generate a center-of-mass feature associated with a particular area in the image. A center-of-mass feature may indicate the location of the center-of-mass of an area (such as a region). In a digital image comprised of pixels, each pixel in the associated area may be treated as having an equal "mass," or pixels may be weighted (e.g., by the intensity of the pixel in the red, green, blue or combination of channels). In some embodiments, a center-of-mass location for a region may be calculated using image moments. In some embodiments, the center-of-mass {x,y} of an area of the image may be calculated in accordance with:

$$\{x, y\} = \left\{\frac{M_{10}}{M_{00}}, \frac{M_{01}}{M_{00}}\right\}, \text{ where} \quad (2)$$

$$M_{ij} = \sum_x \sum_y x^i y^j I(x, y) \quad (3)$$

and I(x,y) is the intensity value of a pixel at the (x,y) location (with an intensity equal to 1 if the pixel is in the region, and equal to 0 if it is not). If the region is a simple geometric form (e.g., a rectangle bounding a face in an image), the center-of-mass of the region can be located using known geometric relationships.

In some embodiments, the center-of-mass feature may be represented by a single location in the image (e.g., the location of the center-of-mass) or by an area in the image. For example, a center-of-mass feature may be centered on the center-of-mass location, and may occupy a portion of the image whose size is proportional to the "mass" of the area (e.g., proportional to the weighted or unweighted number of pixels in the area). In FIG. 5, center-of-mass features 508, 510, 512 and 514 are illustrated, corresponding to the regions 402, 404, 406 and 408, respectively. The center-of-mass features illustrated in FIG. 5 are shown as having radii proportional to the number of pixels in the associated regions, but other embodiments may associate a center-of-mass feature with only the location of the center-of-mass.

In some embodiments, the model logic 208 may generate one or more object features representative of objects in the scene captured in the image. The model logic 208 may be configured to identify objects of various types, and to generate corresponding object features when an object is identified. Any suitable machine learning technique, such as cascade feature classification, may be used to identify an object in the image. Objects that may be identified by the model logic 208 include faces, bodies (e.g., torsos, arms, legs, hands), vehicles, animals, trees and plants, for example. When the model logic 208 identifies an object, the model logic 208 may generate an object feature for that object at a corresponding location in the image (e.g., at the center-of-mass of the identified object, or any other representative point or area). FIG. 5 illustrates a head feature 504 (corresponding to the head 314 of the person 302 in the region 402) and three body features 506 (corresponding to the body of the person 302 in the region 402), as generated by the model logic 208. Thus, one or more different types of features may be associated with a region. For example, the center-of-mass feature 508 and the object features 504 and 406 may form a feature set 502 associated with the region 402. The feature set 502 may be referred to simply as the feature 502, for convenience. In some embodiments, any of the features discussed herein may be represented in a model by one or more feature points, which may be distributed across the feature and/or mark the boundaries or points of interest of the feature.

In some embodiments, a user may use the input device 210 to indicate the presence, location and/or type of feature in the image. For example, the user may use a touchscreen included in the input device 210 to outline or point to an object in the image, and the model logic 208 may respond by creating a feature associated with the user input.

Figure 6:
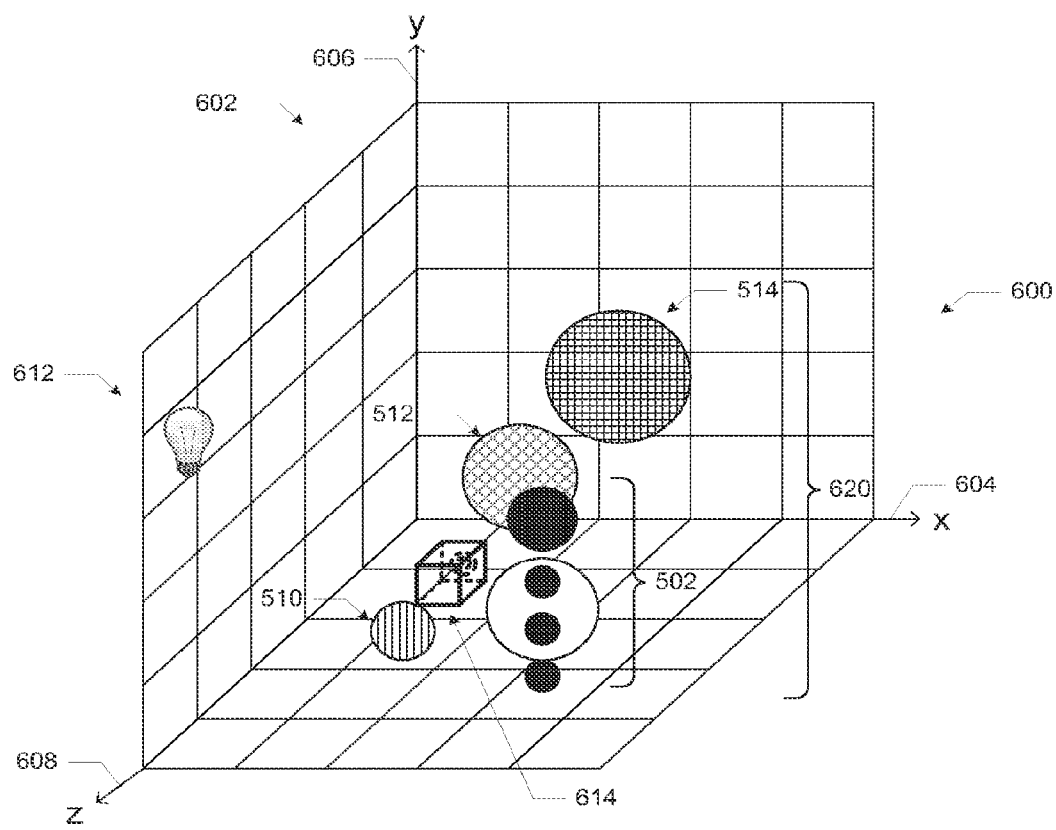
FIG. 6 illustrates a model of the image of FIG. 3 in a three-dimensional coordinate system, as generated by the image capture feedback system of FIG. 2, in accordance with various embodiments.

FIG. 6 illustrates an example three-dimensional model 600 of the image 300 of FIG. 3, as generated by the model logic 208. In particular, the model logic 208 may define the model 600 in a three-dimensional coordinate system 602 having an x-axis 604, a y-axis 606, and a z-axis 608. The features of the model 600 (e.g., the features and feature sets 502, 510, 512 and 514) may be associated with different depths in the image 300, which may be reflected in the model 600 as different z-coordinates. The term "scene features" may be used herein, and may include features in the model associated with objects in the captured scene. In FIG. 6, the set of all scene features associated with the model 600 is labeled with the reference numeral 620.

The model logic 208 may assign different weights to different scene features. These different weights may affect how features are handled when a score for the image is generated by the scoring logic 222. In some embodiments, features of greater visual interest (e.g., faces, objects that occupy most of the captured scene, objects closest to the ICD 104) may be assigned relatively higher weights, and thus the aesthetic aspects of these features may have a stronger influence on the score of the image as compared to features of lesser visual interest (e.g., when a weighted average is computed). The model logic 208 may also assign different weights to various scene features depending upon the aesthetic criterion being evaluated (e.g., local background salience, color complementarity, or any of the other aesthetic criteria discussed below). In some embodiments, a user may indicate (e.g., via a touchscreen as discussed above with reference to user-indicated features) that a particular feature is a "favorite" or "focal" feature, and that feature may be given a high weight. Weights may be used to adjust contributions from the associated features as coefficients in a linear or non-linear combination, or in any other suitable manner.

A model may include scene features that do not represent particular objects in the scene captured in the image, but represent other elements that bear on the scene captured in the image. For example, in some embodiments, the model logic 208 may be configured to generate one or more light source features and include the light source features in the model. The light source features may represent the way in which light impinges on objects in the captured scene, and may have associated locations and other properties (e.g., warmth or diffusivity). The model logic 208 may estimate the location and other properties of a light source feature by, among other things, identifying the angle of shadows in the image and identifying portions of the image having maximum or minimum contrast. FIG. 6 illustrates a light source feature 612 positioned within the three-dimensional coordinate system 602 as part of the model 600. Additional properties of light source features may include time-of-day and weather (which may be representative of overall lighting conditions).

A model may include a feature representative of the ICD 104, herein referred to as an ICD feature. An ICD feature may represent any of a number of properties of the ICD 104 with respect to the captured scene, such as position (e.g., x-, y-, and/or z-coordinates), orientation (e.g., rotation about the axis of image capture or any other axis of the ICD 104), and ICD settings (e.g., zoom, aperture, shutter speed, ISO/film speed, flash, depth-of-field, frame rate for video, resolution, high dynamic range (HDR) settings (e.g., related to multiple exposures), etc.). The model logic 208 may include the ICD feature in the model with properties corresponding to those of the ICD 104. In some embodiments, the properties of the ICD 104 may be at least partially provided by sensors included in the input device 210, such as GPS or accelerometer sensors, or stored in a memory containing settings of ICD 104 (e.g., the storage device 226). FIG. 6 illustrates an ICD feature 614 positioned within the three-dimensional coordinate system 602 as part of the model 600. The ICD feature 614 may have a location (in the coordinate system 602), an orientation, and one or more additional settings such that an ICD having the same properties as the ICD feature 614 would capture the image 300.

In some embodiments, a model generated by the model logic 208 may attempt to be as complete a representation as possible of the objects in the captured scene and the ICD 104. For example, the model logic 208 may generate a three-dimensional model of a captured scene that recreates all of the objects in the scene. In other embodiments, the model generated by the model logic 208 may take the form of various abstractions of the scene. For example, the model may include a sphere, circle, rectangle, plane, or other two- or three-dimensional shape for one or more features as an approximation to the actual shape of a corresponding object in the scene (e.g., a sphere for a head feature). By generating a model of the scene captured by the image, the model logic 208 may work in conjunction with the scoring logic 222 and the recommendation logic 238 to determine how changes in the settings and other properties of the ICD 104 (represented in the model by the ICD feature) or changes in the position or other properties of the objects in the scene (e.g., as represented in the model by the scene features) may change the captured image, and thereby generate a recommendation for an action that may be taken to improve upon the image.

In order to determine which action will improve upon the image, the evaluation logic 216 may generate a score for the image. The score may be indicative of the aesthetic value of the image, according to one or more aesthetic criteria. In particular, the evaluation logic 216 may include scoring logic 222, which may be configured to apply a scoring metric to the model to generate the score for the image. In some embodiments, the scoring logic 222 may evaluate the model using a number of different subscoring metrics (each corresponding to a particular aesthetic criterion), then aggregate these various subscoring metrics in a final scoring metric. A number of such different subscoring metrics are now discussed with respect to various components that may be included in the scoring logic 222, and illustrated with reference to the example image 300 of FIG. 3.

In some embodiments, the scoring logic 222 may include salience logic 230. The salience logic 230 may be configured to generate the salience of various portions of the image. In general, the salience of a portion of an image may be representative of the likelihood that that portion of the image will attract the attention of a human viewer. The most salient portions of an image may be those with unusual intensity, color and/or orientation, for example. The salience logic 230 may implement any of a number of known techniques for generating a salience value for one or more locations in an image, such as those described by Koch et al. in U.S. Patent Application Publication No. 2012/0106850, published May 3, 2012 and incorporated by reference herein. In particular, the salience logic 230 may generate a salience map, salience (k), which returns a salience value for each location k in the image.

The salience logic 230 may be configured to further process the salience values in any of a number of ways. In some embodiments, the salience logic may be configured to generate a local background salience for each feature generated by the model logic 208. As used herein, the term "background"

may refer to portions of an image other than a particular feature, whether or not those portions represent objects further away from the ICD 104 than an object corresponding to the particular feature. A local background salience for a feature may be a maximum, average, or other representation of the salience of a portion of the image local to the feature, but not including the feature. This portion may be referred to as the local background area. Local background salience may be relevant to the aesthetic quality of an image because it is often desirable to frame objects of interest (e.g., faces) against non-distracting backgrounds. If a feature is near salient portions of an image, that feature may be less visually distinct, and thus an image seeking to emphasize the feature may be of relatively low quality. Thus, low local background salience for a particular feature may indicate greater aesthetic quality.

Figure 7:
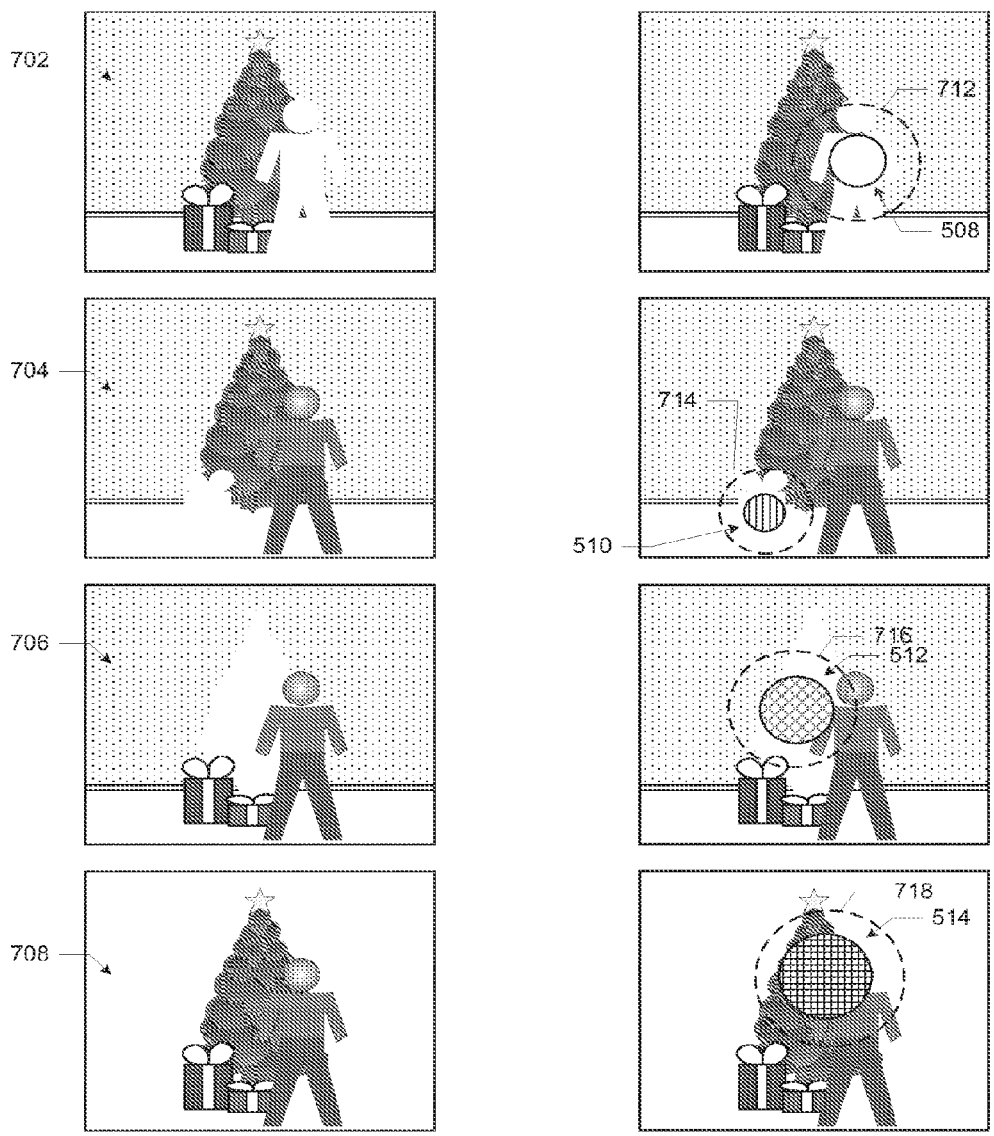
FIG. 7 illustrates regions and areas of the image of FIG. 3 used by the image capture feedback system of FIG. 2 to perform a local background salience analysis, in accordance with various embodiments.

In some embodiments, the local background area of a feature may include a portion of the image at a different depth from the feature. For example, FIG. 7 illustrates regions and areas of the image 300 that may be used by the salience logic 230 to perform a local background salience analysis, in accordance with various embodiments. On the left side of FIG. 7, background areas 702, 704, 706 and 708 are illustrated for the center-of-mass features 508, 510, 512 and 514, respectively. In the embodiment of FIG. 7, the background areas 702, 704, 706 and 708 correspond to the complement of the regions 402, 404, 406 and 408, respectively. In some embodiments, the salience logic 230 may use the entire background area as the local background area, determine the salience of the entire local background area, and aggregate this salience to determine a local background salience.

In some embodiments, the local background area of a feature may include a portion of the image within a radius of the feature. The radius may vary depending upon, e.g., the size or type of the feature. For example, the right side of FIG. 7 illustrates background areas 702, 704, 706 and 708, along with the center-of-mass features 508, 510, 512 and 514 for reference. In some embodiments, the local background area associated with each of the center-of-mass features 508, 510, 512 and 514 may be the portion of the background areas 702, 704, 706 and 708, respectively, within a particular radius of the center-of-mass features 508, 510, 512 and 514, respectively. The local background areas for each of the regions 508, 510, 512 and 514 are illustrated as 712, 714, 716, and 718, respectively.

The salience logic 230 may generate the local background salience in any suitable manner. For example, the local background salience may be computed using known techniques for determining compressibility of a portion of an image. In another example, for each feature i in a model of an image, the salience logic 230 may generate the local background salience background_salience(i) in accordance with $$\text{background\_salience}(i) = \sum_{k \in LBA(i)} \text{salience}(k), \quad (4)$$

where salience(k) is the salience value at location k, and LBA(i) is the local background area of feature i. The salience logic 230 may aggregate the local background saliences for each feature into a salience subscore. In some embodiments, the salience subscore may be generated in accordance with $$\text{salience\_subscore (image)} = \sum_{i=1}^{N} \frac{1}{\text{background\_salience}(i)} \quad (5)$$

where N is the total number of features in the model. In some embodiments, the score generated for the image by the scoring logic 222 may be based at least in part on at least one local background salience generated by the salience logic 230. For example, the score generated for the image by the scoring logic 222 may be based on an aggregate local background salience for multiple features.

In some embodiments, the scoring logic 222 may include color complementarity logic 232. The color complementarity logic 232 may be configured to perform a color complementarity analysis between a local area of each feature (generated by the model logic 208) and a local background area of each feature. A color complementary analysis may indicate when the colors of a particular feature (e.g., the shirt 310 of the image 300) are similar to or different from colors of objects near to or in the background of the particular feature. Greater dissimilarity may make the particular feature more visually distinct, thereby indicating greater aesthetic quality.

In some embodiments, when a particular feature is associated with a region, the local area used by the color complementarity logic 232 may be the region. In some embodiments, the local background area of a particular feature may be all portions of the image not corresponding to the particular feature (e.g., the complement of the particular feature) or not corresponding to a region that includes the particular feature. The model logic 208 may be configured to generate a local background area for each feature for use by the color complementarity logic 232. In some embodiments, the local background area of a feature may be the complement of the feature in the image. In some embodiments, the local background area of a particular feature may be the complement of a region with which the particular feature is associated (e.g., as discussed above with reference to the salience logic 230). In some embodiments, the local background for a feature may be defined in the same way as the local background area discussed above with reference to the salience logic 230.

Figure 8:
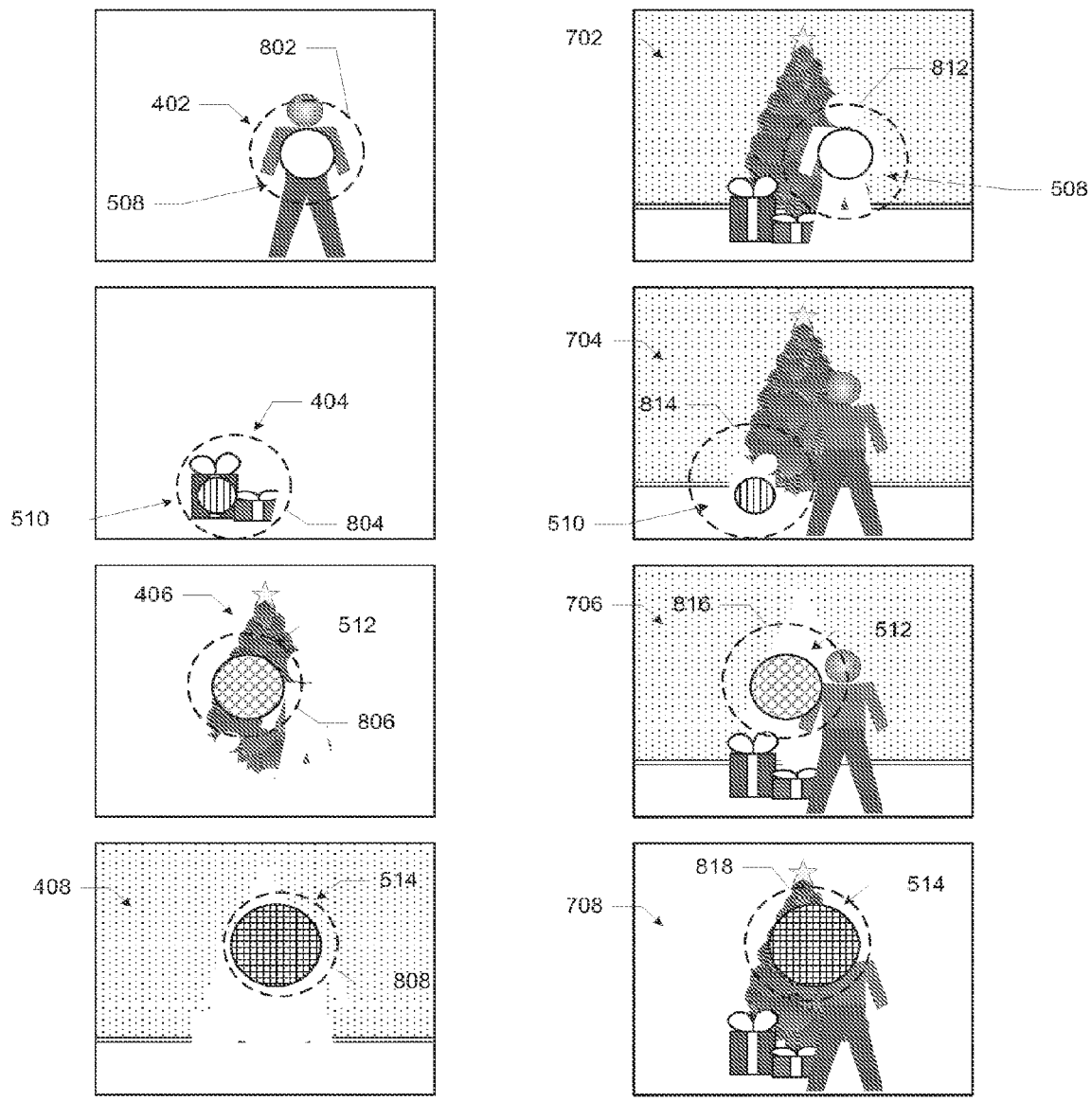
FIG. 8 illustrates regions and areas of the image of FIG. 3 used by the image capture feedback system of FIG. 2 to perform color complementarity analysis, in accordance with various embodiments.

For example, FIG. 8 illustrates regions and areas of the image 300 that may be used by the image capture feedback system 200 to perform color complementarity analysis, in accordance with various embodiments. On the left side of FIG. 8, the regions 402, 404, 406 and 408 are illustrated along with the associated center-of-mass features 508, 510, 512 and 514, respectively. In some embodiments, the color complementarity logic 232 may use the entire associated region as the local area for color complementarity purposes. In some embodiments, the local area associated with each of the center-of-mass features 508, 510, 512 and 514 may be the portion of the associated region 402, 404, 406 and 408, respectively, within a particular radius of the center-of-mass features 508, 510, 512 and 514, respectively. The local areas for each of the center-of-mass features 508, 510, 512 and 514 are illustrated as 802, 804, 806, and 808, respectively. On the right side of FIG. 8, background areas 702, 704, 706 and 708 (as discussed above with reference to FIG. 7) of each of the center-of-mass features 508, 510, 512 and 514 are illustrated. In some embodiments, the color complementarity logic 232 may use the entire associated background area as the local background area for color complementarity purposes. In some embodiments, the local background area associated with each of the center-of-mass features 508, 510, 512 and 514 may be the portion of the associated background 702, 704, 706 and 708, respectively, within a particular radius of the center-of-mass features 508, 510, 512 and 514, respectively. The local background areas for each of the center-of-mass features 508, 510, 512 and 514 are illustrated as 812, 814, 816, and 818, respectively.

The color complementarity logic 232 may perform a color complementarity analysis in any suitable manner. For example, in some embodiments, for each feature i in a model of an image, the color complementarity logic 232 may generate a color complementarity value colorcomp(i) in accordance with $$colorcomp(i) = \sum_{j=1}^{C} |hist \ (background \ (i), \ j) - hist \ (localarea \ (i), \ j)| \qquad (6)$$

where background(i) is the portion of the image corresponding to the local background area of feature i, hist(image,j) is the value of the histogram of the image at tonal value j, localarea(i) is the portion of the image corresponding to the local area associated with feature i for color complementarity purposes, and C is the total number of tonal values in the histogram. The color complementarity logic 232 may aggregate the color complementarity for each feature into a color complementarity subscore. In some embodiments, the color complementarity subscore may be generated in accordance with $$colorcomp\_subscore \ (image) = \sum_{i=1}^{N} feature\_colorcomp \ (i) \qquad (7)$$

where N is the total number of features in the model. In some embodiments, the score generated for the image by the scoring logic 222 may be based at least in part on at least one color complementarity generated by the color complementarity logic 232. For example, the score generated for the image by the scoring logic 222 may be based on an aggregate color complementarity for multiple features.

In some embodiments, the scoring logic 222 may include composition logic 234. The composition logic 234 may be configured to compare the image to one or more composition templates. The composition templates may be stored in the storage device 226 or another storage device accessible to the composition logic 234. A composition template may represent a predetermined arrangement or distribution against which the actual arrangement or distribution of objects in an image scene may be compared. The composition logic 234 may compare a composition template to the image (e.g., via some or all of the model), and determine how well the arrangement of scene features in the image align with the desired arrangement or distribution. For example, a well-known composition rule of thumb is known as the "rule of thirds." The rule of thirds embodies the cognitive theory that human visual attention tends to be drawn to golden ratio divisions of an image, and that photographers should thus align important objects in a scene with these golden ratio points and lines. A composition template, therefore, may reflect this rule by rewarding images in which objects are aligned in the scene with these golden ratio points and lines.

In some embodiments, a composition template may have the same dimensions as the image, or may be scalable to match the dimensions of the image, and may indicate desired locations for features of the image in accordance with predetermined aesthetic criteria. In some embodiments, for example, the composition template may associate, with each pixel in the image, a template value in the interval [0,1]. Pixels corresponding to scene features in the model of the image may be scaled by the associated template value. In this manner, pixels corresponding to scene features in areas in which the template value is high (e.g., close to 1) will be attenuated less than pixels corresponding to features in areas in which the template value is low (e.g., close to 0). Summing or otherwise aggregating the scaled pixel values may reflect how well the features (e.g., the scene features) in the model align with the areas of the template with high values.

Figure 9:
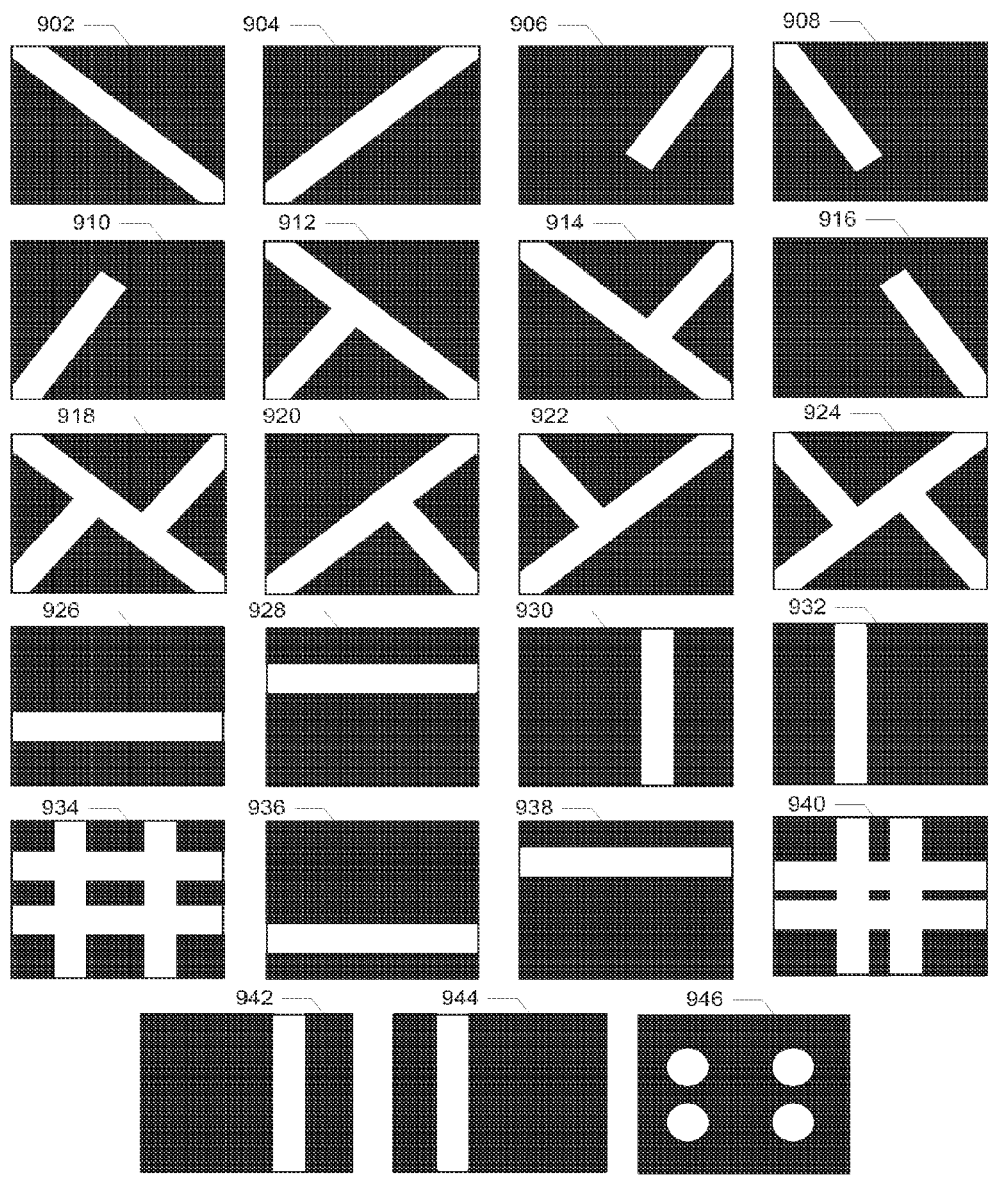
FIG. 9 depicts various composition templates against which the image capture feedback system of FIG. 2 may compare an image, in accordance with various embodiments.
Figure 10:
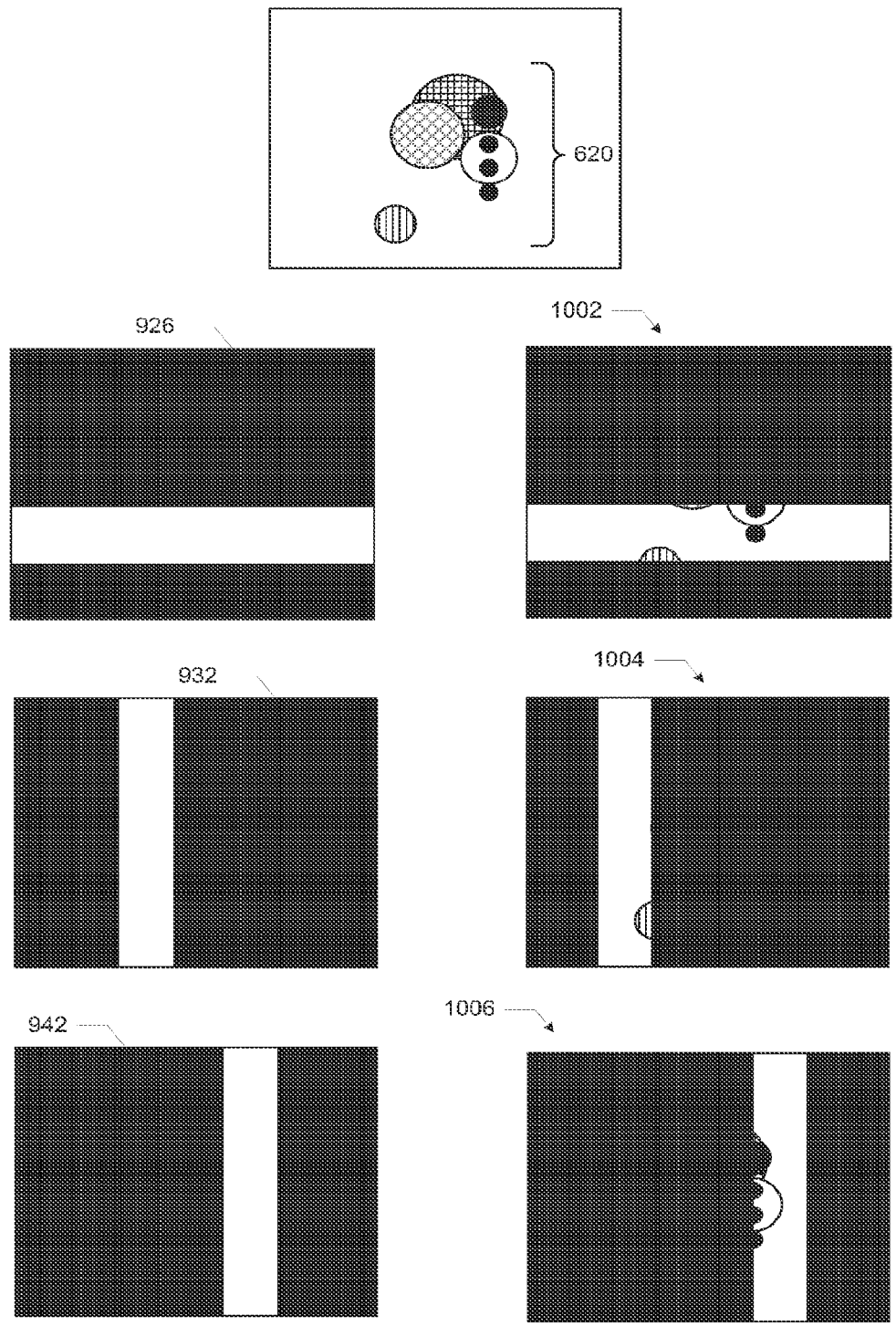
FIG. 10 illustrates a comparison performed by the image capture feedback system of FIG. 2 between the model associated with the image of FIG. 3 and select composition templates, in accordance with various embodiments.

For example, FIG. 9 depicts various composition templates 902-946 against which the image capture feedback system 200 may compare an image, in accordance with various embodiments. The white portions of the composition templates 902-946 may indicate high template values (e.g., template values close to 1), while the black portions of the composition templates 902-946 may indicate low template values (e.g., template values close to 0). As discussed above, the template value for a particular pixel may represent a weighting that may be applied to the corresponding pixel in the model of the image to determine how well scene features in the model of the image align with the "desired" composition represented by the composition template. FIG. 10 illustrates a comparison between the scene features 620 of the model 600 (FIG. 6, reproduced in two dimensions at the top of FIG. 10 for convenience) and the composition templates 926, 932 and 942 (reproduced on the left side of FIG. 10). As shown by the comparisons 1002, 1004 and 1006 on the right side of FIG. 10, the scene features 620 may poorly align with the white regions of the composition templates 926 and 932, but may better align with the white region of the composition template 942.

In some embodiments, the composition logic 234 may identify the composition template that is most similar to the image. The score generated by the scoring logic 222 for the image may then be based at least in part on a comparison between the image and the composition template identified as most similar to the image. In some embodiments, a user may select a composition template, and the score generated by the scoring logic 222 for the image may be based at least in part on a comparison between the image and the user-selected composition template. In some embodiments, a user may have the option to select a desired composition template (e.g., for more advanced users), or may allow the image capture feedback system 200 to automatically evaluate one or more composition templates.

The composition logic 234 may compare the image to one or more composition templates in any suitable manner. For example, in some embodiments, the composition logic 234 may compute a composition subscore composition_subscore (image) in accordance with $$composition\_subscore \ (image) = \max_{i=1:Q} \left[ \sum_{j=1}^{P} \frac{template \ (i, \ j) \cdot featurepix \ (j)}{sum \ (template \ (i, \ :))} \right] \qquad (8)$$

where template(i,j) is in the interval [0,1] and represents the value of the composition template i at pixel j, featurepix(j) is a binary function having a value of 1 if pixel j in the image corresponds to a feature in the model and 0 otherwise, sum (template(i,:)) is the sum of all of the template values of template i, P is the total number of pixels in image, and Q is the total number of composition templates. In this manner, the composition logic 234 may identify the composition template that maximizes the sum in Eq. 8, and thus best aligns with the features in the image, and may generate the composition subscore based on the alignment between the image and this "best" composition template. The score generated for the image by the scoring logic 222 may be based at least in part on a comparison between one or more composition templates and the image (e.g., the model), as generated by the composition logic 234.

In some embodiments, the scoring logic 222 may include lighting logic 236. The lighting logic may be configured to evaluate the aesthetic quality of the lighting conditions in the image, in accordance with one or more predetermined lighting criteria. In some embodiments, the lighting conditions in the image may be generated by the model logic 208 as part of the generation of the model (e.g., as discussed above with reference to light source features, such as the light source feature 612 of FIG. 6). The lighting logic 236 may be configured to analyze lighting conditions in the image to estimate the time-of-day at which the image was captured, lighting gradients on various objects in the captured scene, or any other lighting conditions bearing on the aesthetic quality of the image. For example, in some embodiments, the lighting logic 236 may assign a low aesthetic quality to an image in which there is strong back or front lighting angles on a human face.

Figure 11:
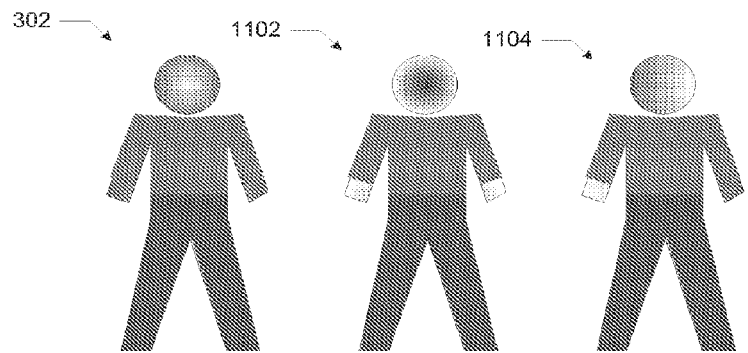
FIG. 11 illustrates an object in the image of FIG. 3 under two alternative lighting scenarios, as determined by the image capture feedback system of FIG. 2, in accordance with various embodiments.

FIG. 11 illustrates an image of the person 302 (from the image 300 of FIG. 3) under two alternative lighting scenarios generated by the model logic 208. The model logic 208 may generate these illustrative images of the person by moving, reorienting or otherwise changing the properties of the light source feature 612 in the model 600 or by adding one or more additional light source features, for example. In the scenario 1102, the person 302 may be located between the ICD 104 and a light source. In the scenario 1104, a light source may be located to the side of both the person 302 and the ICE 104. By using a model of the objects in the captured scene, the model logic 208 may determine the effects of changes in lighting on the ways in which the objects in the captured scene are illuminated. The lighting logic 236 may then evaluate the initial and/or changed lighting conditions.

The lighting logic 236 may evaluate the lighting conditions in the image in any suitable manner. For example, in some embodiments, the lighting logic 236 may compute a lighting subscore lighting_subscore(image) in accordance with $$\text{lighting\_subscore(image)} = \sum_{j=1}^{N} \sum_{i=1}^{LC} \text{lighting\_condition}(i, j) \quad (9)$$

where lighting_condition(i,j) is the value of a score for a particular lighting condition i with respect to a particular feature j in the model of image, LC is the total number of lighting conditions evaluated by the lighting logic 236, and N is the total number of features in a model. Not all features in a model may be relevant to lighting conditions, and thus the contribution of these features to the lighting subscore may be zero or small. Examples of three different techniques for generating a score for a particular lighting condition are given below by Eqs. 10-12:

$$\text{lighting\_condition}(1, j) = \frac{1}{|\text{opt\_angle}(i) - \text{identified\_angle}(i)|} \quad (10)$$

$$\text{lighting\_condition}(2, j) = \frac{1}{|\text{opt\_diffuse}(i) - \text{identified\_diffuse}(i)|} \quad (11)$$

$$\text{lighting\_condition}(3, j) = \frac{1}{|\text{opt\_warmth}(i) - \text{identified\_warmth}(i)|} \quad (12)$$

where opt_angle(i) is the optimal or desired angle of lighting incident on feature i, identified_angle(i) is the incident angle of lighting on feature i in the image (as identified by the model logic 208), opt_diffuse(i) is the optimal or desired diffusivity of lighting incident on feature i, identified_diffuse(i) is the diffusivity of the light incident on feature i in the image (as identified by the model logic 208), opt_warmth(i) is the optimal or desired warmth of lighting incident on feature i, and identified_warmth(i) is the warmth of the light incident on feature i in the image (as identified by the model logic 208). The score generated for the image by the scoring logic 222 may be based at least in part on the evaluation of the lighting conditions in the image, as generated by the lighting logic 236.

Lighting conditions may be evaluated in any of a number of additional ways. For example, if the surface geometry and the material properties of an object in the scene are known, the lighting logic 236 may use information about the angle between the ICD 104 and one or more light sources to estimate specular highlights and penalize images that include such highlights or undesirable types or amounts of such highlights.

As noted above, the scoring logic 222 may be configured to aggregate one or more subscores into an overall scoring metric, and to use the overall scoring metric to generate a score for the image. Any of a number of combinations of subscores may be used to generate a score for the image. For example, in some embodiments, the scoring logic 222 may generate a score for an image in accordance with $$\text{score(image)} = \sum_{i=1}^{SS} w(i) \text{subscore}(i) \quad (13)$$

where subscore(i) indicates the ith subscore aggregated into the scoring metric of Eq. 13 (e.g., any of the subscores described herein), and w(i) is a weight associated with subscore(i) that allows the scoring logic 222 to assign more or less significance to various subscores when aggregating the subscores into the score for the image.

The processing logic 202 may use the score for an image to generate a recommendation for an action to improve on the image. In particular, the processing logic 202 may include recommendation logic 238. The recommendation logic 238 may be coupled with the evaluation logic 216, and may be configured to generate a recommendation for an action based on the score for the image generated by the evaluation logic 216. The recommendation logic 238 may generate the recommendation such that if the ICD 104 captured a second image after the action is performed, the score generated for the second image by the evaluation logic 216 would be better than the score generated for the image by the evaluation logic 216. In other words, the recommendation generated by the recommendation logic 238 is one that will yield a "better" image than the image, based on the aesthetic criteria embedded in the scoring metric applied by the evaluation logic 216.

In the following discussion, the image initially processed may be referred to as the "initial" image to distinguish the image from a second image that may be captured after the initial image (e.g., based on a recommendation from the recommendation logic 238). The model of the initial image may be referred to as the "initial" model, and the features of the initial model may be referred to as the "initial" features.

In some embodiments, the recommendation logic 238 may include candidate logic 212 and action logic 214. The candidate logic 212 may be coupled to the evaluation logic 216, and may be configured to generate a target model having a better score than the score for the initial image generated by the evaluation logic 216 (e.g., based on the initial model). In some embodiments, the candidate logic 212 may generate this target model by adjusting the ICD feature (e.g., position, orientation or settings) and/or any of the scene features (e.g., the position of a feature corresponding to an object or a lighting source) from their values in the initial model, and determining whether an image captured using the adjusted properties would have a better score than the score for the initial image. These adjusted features may be referred to as "candidate" features, and may together form a "candidate" model.

The candidate logic 212 may include one or more physical and/or optical rules usable by the candidate logic 212 to determine what an image captured by the candidate ICD feature of the candidate scene features would look like. This image may be referred to as the "candidate" image. For example, the candidate logic 212 may project the candidate scene features of the model onto a plane perpendicular to the imaging axis of the candidate ICD feature (the plane located, for example, at a distance related to the candidate ICD feature's depth-of-field), and filter that projection as appropriate using other settings of the candidate ICD feature (e.g., color filters and aperture settings) to generate a candidate image. The candidate logic 212 may be configured to provide this candidate image to the evaluation logic 216, which may process the candidate image and generate a score for the candidate image using the techniques described above. The evaluation logic may provide this score to the candidate logic 212, which may determine whether the candidate image has a higher score than the initial image, and therefore that the candidate model should be used to generate a recommendation for an action. A candidate model upon which the recommendation logic 238 may generate a recommendation may be referred to as a "target" model, and the image associated with the target model referred to as the "target" image.

In some embodiments, the candidate logic 212 (in conjunction with the evaluation logic 216) may perform an optimization technique that seeks to generate a target model that optimizes an image score by allowing adjustments of both objects in the scene and the ICD 104. For example, the candidate logic 212 may perform this optimization in accordance with $$\max_{feature\ properties} \text{score(image captured with } ICD \text{ of scene)} \quad (14)$$

such that physical constraints respected.

As indicated in Eq. 14 (and Eqs. 15 and 16 below), the candidate logic 212 may be configured to identify a target model subject to physical constraints. For example, since most users are likely less than seven feet tall, a target model that requires the ICD 104 to be positioned eight feet above ground would not be feasible and thus should not be considered. The candidate logic 212 may be configured with such additional constraints, such as the limited ability for a user to get close to the ground or operate the ICD 104 at an uncomfortable angle, limitations on the settings of the ICD 104 (e.g., limited focal length and shutter speed), limitations on the moveability of objects in the scene (e.g., a building or other large object may not be readily moveable), and/or limitations on the ability to include additional objects or supporting elements in the scene (e.g., the unavailability of additional lighting sources), and may respect such constraints when identifying a suitable target model. These constraints may be stored in the storage device 226, and may be explicitly enumerated by a user in an "advanced" mode of the image capture feedback system 200 or imposed by default without user intervention, for example.

In some embodiments, the candidate logic 212 (in conjunction with the evaluation logic 216) may perform an optimization technique that seeks to generate a target model that optimizes an image score by allowing adjustments of only the ICD 104, but not adjustments of the objects in the scene. Such embodiments may be suitable in a nature photography setting, for example, where the ICD 104 may be readily moved but the objects in the scene may not. For example, the candidate logic 212 may perform this optimization in accordance with $$\max_{ICD\ feature\ properties} \text{score(image captured with } ICD \text{ of scene)} \quad (15)$$

such that initial scene features remain fixed, and physical constraints respected.

In some embodiments, the candidate logic 212 (in conjunction with the evaluation logic 216) may perform an optimization technique that seeks to generate a target model that optimizes an image score by allowing adjustments of only the objects in the scene, but not adjustments of the ICD 104. Such embodiments may be suitable in a portrait studio setting, where the ICD 104 is a fixed camera and the scene may be more easily rearranged. For example, the candidate logic 212 may perform this optimization in accordance with $$\max_{Iscene\ feature\ properties} \text{score(image captured with } ICD \text{ of scene)} \quad (16)$$

such that initial ICD feature remains fixed, and physical constraints respected.

In some embodiments, the candidate logic 212 may attempt to generate a candidate model having candidate scene and ICD features that achieves a global or local maximum of any of the scoring metrics discussed herein in accordance with any of Eqs. 14, 15 and 16. A candidate model meeting any desired optimality criteria, and upon which a recommendation is to be based, may be referred to as a "target" model, and the associated candidate image may be referred to as a "target" image. In some embodiments, a target model need not meet local or global optimality criteria; instead, the target model may be any model having at least one feature different from the initial model, as long as the target model is associated with a better score than the initial model. In some embodiments, a better score may mean a higher score.

The candidate logic 212 may use any suitable numerical or other computational techniques for identifying the target model (e.g., to implement any of Eqs. 14, 15 and 16), such as simulated annealing, gradient descent, or genetic algorithms, for example. In some embodiments, candidate logic 212 may generate a candidate model by perturbing one or more features of the initial model, evaluate the corresponding candidate image to determine whether the candidate image has a better score than the initial image, and identify the candidate model as a target model if desired optimality criteria are satisfied.

Figure 12:
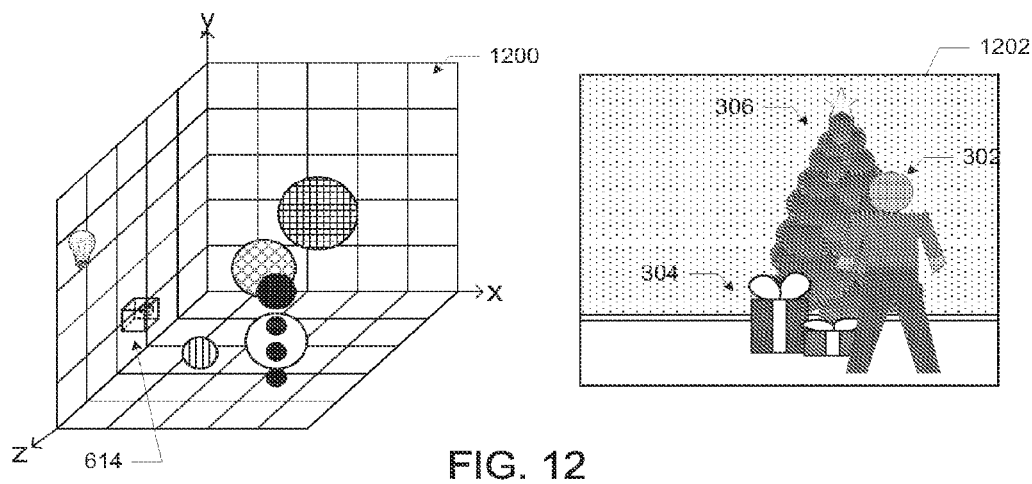
FIGS. 12-13 depict illustrative target models and corresponding target images of the scene of FIG. 3, as generated by the image capture feedback system of FIG. 2, in accordance with various embodiments.
Figure 13:
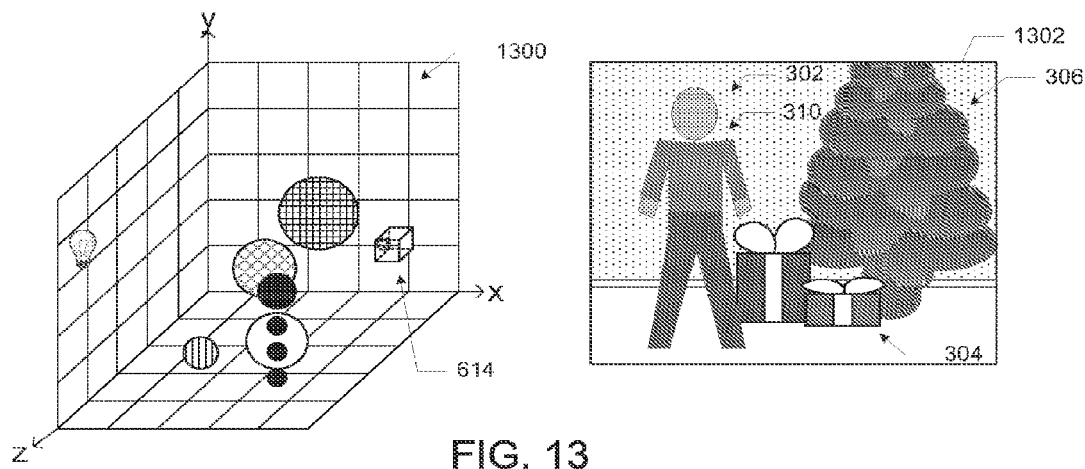

FIGS. 12-13 depict illustrative target models and corresponding target images of the scene 316 of FIG. 3, as generated by the image capture feedback system of FIG. 2. In the target model 1200, the ICD feature 614 has been shifted toward the y-z plane relative to its position in the model 600. The resulting target image 1202 (corresponding to the target model 1200) illustrates that the objects 302, 304 and 306 in the image 1202 are shifted to the right relative to their positions in the image 300. The target image 1202 may have one or more improved aesthetic qualities relative to the image 300 (e.g., better alignment with a composition template).

In the target model 1300, the ICD feature 614 has been shifted away from the y-z plane and toward the x-y plane relative to its position in the model 600. The resulting target image 1302 (corresponding to the target model 1300) illustrates that the objects 302, 304 and 306 in the target image 1302 are arranged differently than they appear in the image 300, due to the change in position of the ICD feature 614. The target image 1302 may have one or more improved aesthetic qualities relative to the image 300 (e.g., better color complementarity if the shirt 310 is approximately the same color as the tree 306). In other embodiments, conforming a scene to the target model may require moving one or more of the objects in the scene, instead of or in addition to changing the properties of the ICD feature 614.

Once the candidate logic 212 identifies a suitable target model, the action logic 214 (which may be coupled to the candidate logic 212) may use the difference(s) between the initial and target models to generate a recommendation for an action. In some embodiments, the action logic 214 may compare the properties of the target ICD feature to the properties of the ICD feature, and may use the differences between the properties to generate the action recommendation. In particular, the recommendation may direct the user to perform an action that will bring the properties of the ICD 104 closer to the properties of the target ICD feature. In some embodiments, the action logic 214 may compare the properties of one or more target scene features to the properties of corresponding initial scene features, and may use the differences between the properties to generate the action recommendation. In particular, the recommendation may direct the user or subjects of the image to perform an action that will bring the properties of the objects in the scene closer to the properties of the target scene features.

The action logic 214 may generate any one or more of a number of action recommendations. For example, the action recommendation may include an ICD adjustment. In some embodiments, the target ICD feature and the ICD feature may differ in horizontal, vertical and/or depth coordinate; in such embodiments, the action logic 214 may generate a recommendation for a "move" or "zoom" action as appropriate. In some embodiments, the target ICD feature and the ICD feature may differ in orientation; in such embodiments, the action logic 214 may generate a recommendation for a "rotate" action as appropriate (e.g., suggesting that a user orient the ICD 104 in a "portrait" orientation rather than a "landscape" orientation). In some embodiments, the target ICD feature and the ICD feature may differ in one or more color settings; in such embodiments, the action logic 214 may generate a recommendation for a "color filter" action (e.g., applying a sepia or other color filter). In some embodiments, the action recommendation generated by the action logic 214 may include a scene adjustment recommendation in addition to or instead of an ICD adjustment recommendation (e.g., directing an object to move, a subject to stand up or sit down, or for a lighting source position to be changed).

The image capture feedback system 200 may indicate the recommended action to the user or other individuals or devices. In particular, the processing logic 202 may include indicator logic 220. The indicator logic 220 may be coupled to the recommendation logic 238 and to the output device 218, and may be configured to indicate the action recommendation generated by the recommendation logic 238 to the user via the output device 218. In some embodiments, the output device 218 may include another device or device interface, and the action recommendation will instruct a device to adjust its properties in accordance with the recommended action. For example, the output device 218 may include a lighting source interface, the recommended action may be the movement of a lighting source coupled to the lighting source interface, and the lighting source may perform the recommended action upon the lighting source interface receiving and processing the recommendation from the indicator logic 220.

In some embodiments, the indicator logic 220 may be configured to generate an audible, visible, haptic or other indication to the user. For example, in some embodiments, the output device 218 may include an audio device, and the indicator logic 220 may be configured to generate a tone in a left or right speaker to indicate that the user should move the ICD 104 to the left or right, respectively. In some embodiments, the output device 218 may generate audible voice instructions corresponding to the recommended action, such as "move left," "zoom out," or "increase exposure," for example.

In some embodiments, the output device 218 may include a display device, and the indicator logic 220 may indicate the action by providing a visual indication to the user. Any appropriate visual indicator may be used, such as text (e.g., "turn the camera to portrait orientation," "zoom out," "move subject left"), symbols, illustrations or other visual indicators. FIGS. 14-18 depict various visual displays that may be generated by the indicator logic 220 to indicate actions that may be performed to improve the image 300, discussed below. These displays may include the image currently viewed by the ICD 104 (e.g., viewed through the viewfinder or displayed on a digital display of the ICD 104, referred to herein as the "current image"), and may correspond to the initial image analyzed by the processing logic 202.

Figure 14:
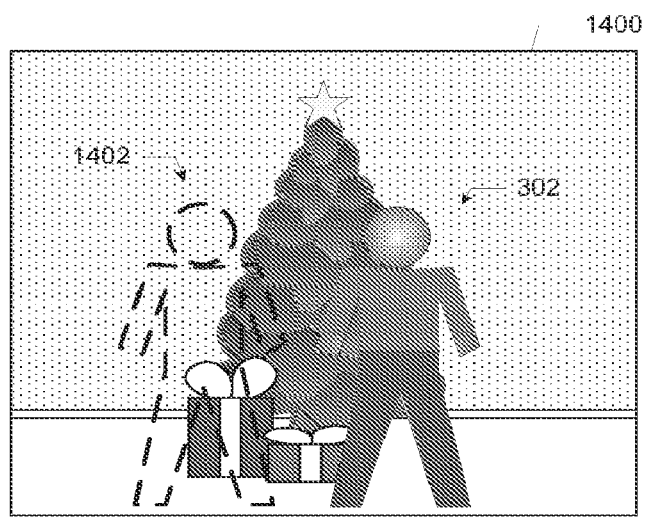
FIGS. 14-19 depict various visual displays that may be generated by the image capture feedback system of FIG. 2 to indicate actions that may be performed to improve the image of FIG. 3, in accordance with various embodiments.

In some embodiments, the indicator logic 220 may indicate the action by displaying an outline of an object in a display of the image in a location that the object would occupy if the action were to be performed. Such an embodiment is illustrated in FIG. 14, in which the indicator logic 220 provides a display 1400 indicating that the person 302 should move to her right so that the person 302 will align with the outline 1402.

Figure 15:
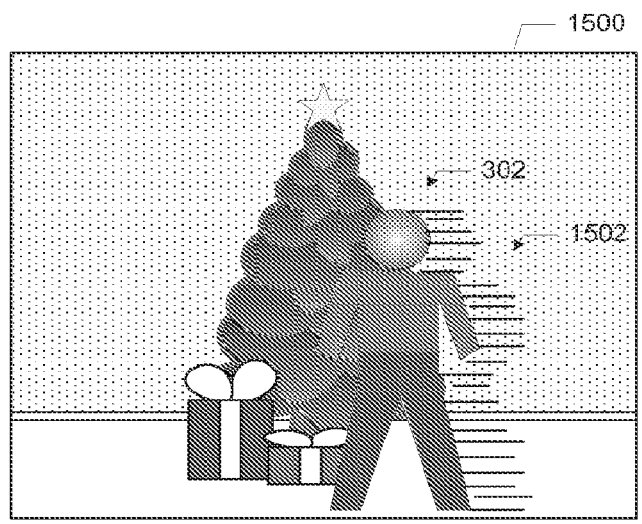

In some embodiments, the indicator logic 220 may indicate the action by displaying a motion trail proximate to an object in a display of the image, the motion trail indicative of movement toward a location that the object would occupy if the action were to be performed. Such an embodiment is illustrated in FIG. 15, in which the indicator logic 220 provides a display 1500 having motion trails 1502 indicating that the person 302 should move to her right (in the direction of the motion trails 1502).

Figure 16:
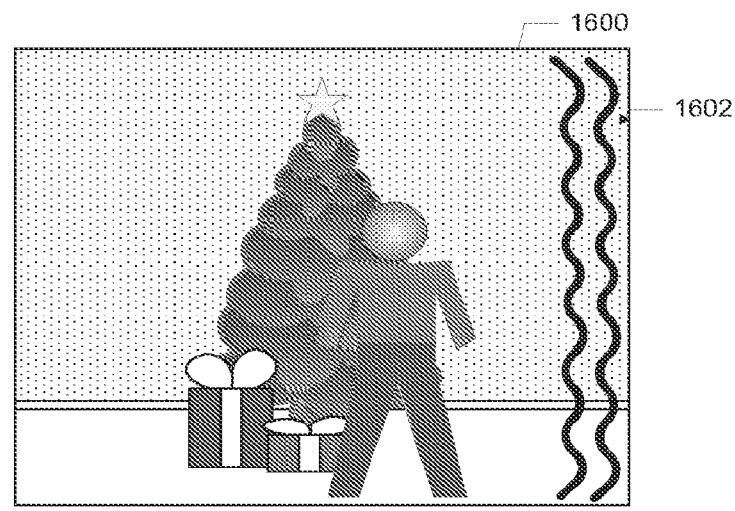
Figure 17:
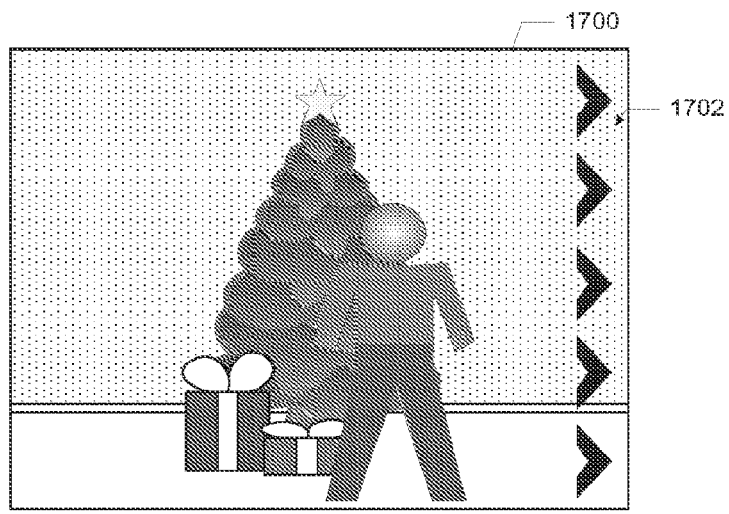

In some embodiments, the indicator logic 220 may indicate the action by displaying an indicator at an edge of the display, the edge selected to correspond to a direction that the user would move the ICD 104 if the user were to perform the action. Such an embodiment is illustrated in FIG. 16, in which the indicator logic 220 provides a display 1600 having a ripple effect 1602 on the right side of the display 1600, indicating that a user should move the ICD 104 to the right. Another such embodiment is illustrated in FIG. 17, in which the indicator logic 220 provides a display 1700 having arrows 1702 on the right side of the display 1700, indicating that a user should move the ICD 104 to the right.

Figure 18:
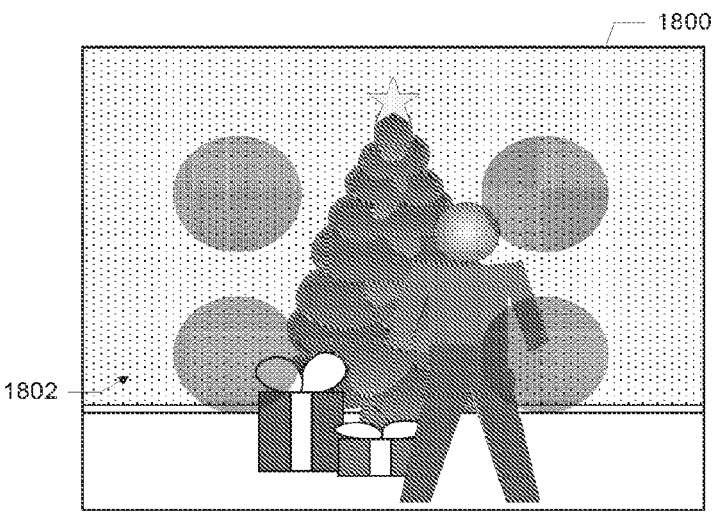

In some embodiments, the indicator logic may overlay or otherwise indicate a composition template with which the user should align the features in the image to improve the image composition. In some embodiments, this composition template may be dynamically selected (e.g., using the techniques described above with reference to the composition logic 234 for finding the composition template that maximizes a composition subscore). The composition template may be provided as a translucent overlay over the current image, and may change as the scene to be captured changes. Such an embodiment is illustrated in FIG. 18, in which an overlay 1802 indicative of the white portion of the composition template 946 may be displayed over the current image in the display 1800. As shown in FIG. 18, the white portion of the composition template 932 may be displayed as a darker overlay in the display 1800; in other embodiments, the black portion of a composition template may be displayed as a darker overlay in the display 1800.

In some embodiments, various other overlays may be provided on a display of the current image. For example, in some embodiments, the display may include circles at each of the golden ratio points (corresponding to the intersection points of a 3×3 grid over the image, as indicated by the white portions of the composition template 946 of FIG. 9). The size of these circles may be adjusted in proportion to the amount of overlap of significant features in the current image with the associated intersection. As the current image changes, the size of these circles may grow or shrink as features move in and out of alignment with these golden ratio points.

Figure 19:
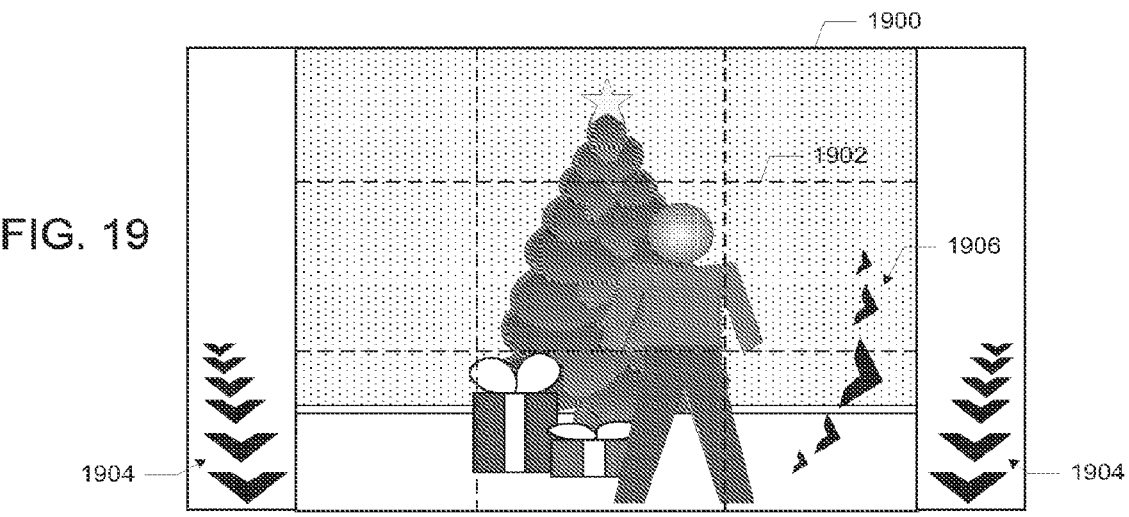

FIG. 19 depicts a display 1900 that includes both static and dynamic composition guidance. The display 1900 may include the grid 1902, which remains fixed in the display. The intersections of the grid 1902 may correspond to points with which the user may wish to align objects of interest in the scene. The display 1900 may also include the indicators 1904, which may appear to be rendered in three dimensions and may be dynamically adjusted by the image capture feedback system 200 to indicate to the user that she should walk forward or backward to adjust the size of the scene within the image capture frame. The display 1900 may also include the indicators 1906, which may be dynamically adjusted by the image capture feedback system 200 to indicate to the user that she should move the ICD 104 up, down, left and/or right to reframe the scene.

Figure 20:
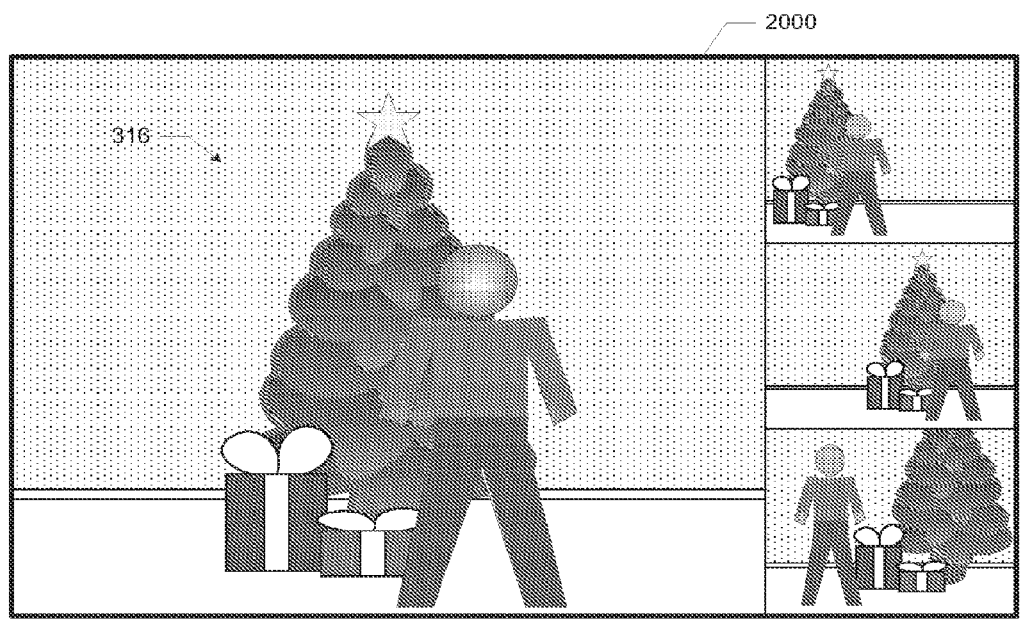
FIG. 20 depicts a visual display that may be generated by the image capture feedback system of FIG. 2 to indicate how the scene of FIG. 3 may look when the properties of the image capture device are adjusted, in accordance with various embodiments.

FIG. 20 depicts a visual display 2000 that may be generated by the image capture feedback system 200 to indicate how the scene 316 may look when the properties of the ICD 104 are adjusted, in accordance with various embodiments. In particular, the display 2000 may include the current image 2002 and one or more alternate images 2004 which may depict the scene 316 when one or more properties of the ICD 104 are changed (e.g., the ICD 104 is moved to a different position, or settings are adjusted). The alternate images may be displayed in a vertical strip as shown, in a horizontal strip, or in any other orientation. The alternate images may be generated by the evaluation logic 216 (e.g., when generating and evaluating a potential target image), and may include one or more target images corresponding to target models having a better score than the current image (which may be the initial image processed by the processing logic 202). In some embodiments, these alternate images (e.g., the alternate images 2004) may be selectable by the user; in response to a user selection, the image capture feedback system 200 may recommend an action corresponding to the selected image, such that if the user captures an additional image after taking the action, the additional image will be similar to the selected alternate image. The image capture feedback system 200 may provide this recommendation in accordance with any of the techniques described above. In some embodiments, the alternate images provided in the display 2000 may not be generated based on a model of the scene captured in the current image, but may be derived from a database (e.g., in the memory device 226) or other source of images of similar content or images captured in a similar geographic location (e.g., all photographs tagged with "Eiffel Tower" in an online database). Including these images in the display 2000 as the alternate images may provide inspiration to the user, who may then perform her own actions to adjust the ICD 104 without receiving an express action recommendation.

Figure 21:
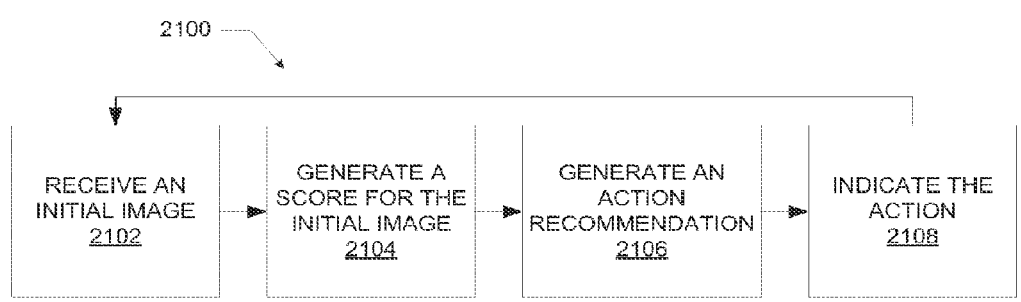
FIG. 21 is a flow diagram of an illustrative process for image capture feedback, in accordance with various embodiments.

FIG. 21 is a flow diagram of an illustrative process 2100 for image capture feedback, in accordance with various embodiments. The operations of the process 2100, although illustrated as performed in a particular sequence for the sake of illustration, may be performed in parallel as suitable.

Operations of the process 2100 may be described as performed by the image capture feedback system 200, as embodied in the computing system 100, for illustrative purposes, but the operations of the process 2100, including individual operations of the process 500, may be performed by any suitably configured computing device or collection of computing devices. Any of the operations of the process 2100 may be performed in accordance with any of the embodiments of the systems 100 and 200 described herein.

The process 2100 may begin at the operation 2102, at which the image capture feedback system 200 (e.g., the receiver logic 206) may receive an image from the ICD 104. At the operation 2104, the image capture feedback system 200 (e.g., the evaluation logic 216) may generate a score for the image received at the operation 2102. The operation 2104 may be performed in accordance with any combination of the scoring and/or subscoring techniques described herein, or any suitable additional or alternative scoring techniques. At the operation 2106, the image capture feedback system 200 (e.g., the recommendation logic 238) may generate a recommendation for an action, such that if the image capture device captures a second image after the action is performed, the score for the second image will be better than the score for the image. The operation 2106 may be performed in accordance with any combination of the action recommendation techniques described herein, or any suitable additional or alternative action recommendation techniques. At the operation 2108, the image capture feedback system 200 (e.g., the indicator logic 220) may indicate the action to the user via the output device 218. The operation 2108 may be performed in accordance with any of the action indication techniques described herein (e.g., those discussed above with reference to FIGS. 14-19, or any suitable additional or alternative action indication techniques. The process may continue by returning to the operation 2102 and receiving another image (e.g., at a predetermined interval after receiving the previous image, or in response to detecting a user motion or other change in the ICD 104, or in response to a user request for further guidance), and processing this newly received image as a next image. The process 2100 may iterate as long as a user engages an image capture application or indicates that she wishes the image capture feedback system 200 to provide guidance. Thus, in some embodiments of the present disclosure, the image capture feedback system 200 may automatically evaluate each image captured by the ICD 104, and may give the user real-time feedback on actions to take to improve the captured images.

A number of examples of embodiments of the present disclosure are listed below. Example 1 is a system for image capture feedback, including: receiver logic to receive an image from an image capture device; evaluation logic, coupled to the receiver logic, to generate a score for the image; recommendation logic, coupled to the evaluation logic, to generate a recommendation for an action, such that if the image capture device captures a second image after the action is performed, the score for the second image will be better than the score for the image; and indicator logic, coupled to the recommendation logic and to an output device, to indicate the recommendation for the action on the output device.

Example 2 may include the subject matter of Example 1, and may further specify that the evaluation logic further includes: model logic, coupled to the receiver logic, to process the image to generate a model representative of the image, the model including a plurality of features at a plurality of locations in the image; and scoring logic to apply a scoring metric to the model to generate the score for the image.

Example 3 may include the subject matter of Example 2, and may further specify that the image capture device is a depth camera and the plurality of features at a plurality of locations includes features located at different depths in the image.

Example 4 may include the subject matter of Example 3, and may further specify that the depth camera includes a heterogeneous camera array.

Example 5 may include the subject matter of Example 3, and may further specify that the evaluation logic is to generate a local background salience for each feature, and that the score for the image is based at least in part on at least one local background salience.

Example 6 may include the subject matter of any of Examples 3-5, and may further specify that the evaluation logic is to perform a color complementarity analysis between a local area of each feature and a local background area of each feature, and that the score for the image is based at least in part on at least one color complementarity.

Example 7 may include the subject matter of any of Examples 2-6, and may further specify that the plurality of features includes a face or a body identified in the image.

Example 8 may include the subject matter of any of Examples 2-7, and may further specify that the image capture device is a depth camera and that the plurality of features includes centers-of-mass of regions at a plurality of depths in the image.

Example 9 may include the subject matter of any of Examples 1-8, and may further specify that the evaluation logic is to compare the image to one or more composition templates, and that the score for the image is based at least in part on the comparison.

Example 10 may include the subject matter of Example 9, and may further specify that the score for the image is based at least in part on the comparison between the image and the composition template most similar to the image.

Example 11 may include the subject matter of any of Examples 9-10, and may further specify that the one or more composition templates include a user-selected composition template.

Example 12 may include the subject matter of any of Examples 2-11, and may further specify that the recommendation logic includes: candidate logic, coupled to the evaluation logic, to generate a target model having a better score than the score for the image; and action logic, coupled to the candidate logic, to generate the action based on a difference between the model and the target model.

Example 13 may include the subject matter of any of Examples 1-12, and may further specify that the output device is a display device, and that the indicator logic is to indicate the recommendation for the action by displaying an outline of an object in a display of the image in a location that the object would occupy if the action were performed.

Example 14 may include the subject matter of any of Examples 1-13, and may further specify that the output device is a display device, and that the indicator logic is to indicate the recommendation for the action by displaying a motion trail proximate to an object in a display of the image, the motion trail indicative of movement toward a location that the object would occupy if the action were performed.

Example 15 may include the subject matter of any of Examples 1-14, and may further specify that the output device is a display device, and that the indicator logic is to indicate the recommendation for the action by displaying an indicator at an edge of the display, the edge selected to correspond to a direction that the image capture device would move if the action were performed.

Example 16 is a method for image capture feedback implemented by a computing device, including: receiving an image from an image capture device; generating a score for the image; generating a recommendation for an action, such that if the image capture device captures a second image after the action is performed, the score for the second image will be better than the score for the image; and indicating the recommendation for the action on an output device.

Example 17 may include the subject matter of Example 16, and may further specify that generating a score for the image includes processing the image to generate a model representative of the image, the model including a plurality of features at a plurality of locations in the image and applying a scoring metric to the model to generate the score for the image.

Example 18 may include the subject matter of Example 17, and may further specify that the image capture device is a depth camera and that the plurality of features at a plurality of locations includes features located at different depths in the image.

Example 19 may include the subject matter of Example 18, and may further specify that the depth camera includes a heterogeneous camera array.

Example 20 may include the subject matter of Example 18, and may further specify that generating a score for the image includes generating a local background salience for each feature, and that the score for the image is based at least in part on at least one local background salience.

Example 21 may include the subject matter of Example 18, and may further specify that generating a score for the image includes generating a color complementarity between a local area of each feature and a local background area of each feature, and that the score for the image is based at least in part on at least one color complementarity.

Example 22 may include the subject matter of Example 17, and may further specify that the plurality of features includes a face or a body identified in the image.

Example 23 may include the subject matter of Example 17, and may further specify that the image capture device is a depth camera and that the plurality of features includes centers-of-mass of regions at a plurality of depths in the image.

Example 24 may include the subject matter of Example 16, and may further specify that generating a score for the image includes comparing the image to one or more composition templates, and that the score for the image is based at least in part on the comparison.

Example 25 may include the subject matter of Example 24, and may further specify that the score for the image is based at least in part on the comparison between the image and the composition template most similar to the image.

Example 26 may include the subject matter of Example 24, and may further specify that the one or more composition templates include a user-selected composition template.

Example 27 may include the subject matter of Example 17, and may further specify that generating a recommendation for an action includes: identifying a target model having a better score than the score for the image; identifying a difference between the model and the target model; and generating an action based on the identified difference between the model and the target model.

Example 28 may include the subject matter of Example 16, and may further specify that the output device is a display device, and that indicating the recommendation for the action includes displaying an outline of an object in a display of the image in a location that the object would occupy if the action were performed.

Example 29 may include the subject matter of Example 16, and may further specify that the output device is a display device, and that indicating the recommendation for the action includes displaying a motion trail proximate to an object in a display of the image, the motion trail indicative of movement toward a location that the object would occupy if the action were performed.

Example 30 may include the subject matter of Example 16, and may further specify that the output device is a display device, and that indicating the action includes displaying an indicator at an edge of the display, the edge selected to correspond to a direction that the image capture device would move if the action were performed.

Example 31 is one or more computer readable media having instructions thereon that, when executed by one or more processing devices of a computing device, cause the computing device to perform the method of any of Examples 16-30.

Example 32 is a system including one or more processing devices and one or more computer readable media having instructions thereon that, when executed by the one or more processing devices, cause the apparatus to perform the method of any of Examples 16-30.

Example 33 is a system for image capture feedback, including: means for receiving an image from an image capture device; means for generating a score for the image; means for generating a recommendation for an action, such that if the image capture device captures a second image after the action is performed, the score for the second image will be better than the score for the image; and means for indicating the recommendation for the action on an output device.

Example 34 may include the subject matter of Example 33, and may further specify that the means for generating a score for the image includes: means for processing the image to generate a model representative of the image, the model including a plurality of features at a plurality of locations in the image; and means for applying a scoring metric to the model to generate the score for the image.

Example 35 is a system for image capture feedback including means for performing the method of any of Examples 16-30.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein.

What is claimed is:

1. A system for image capture feedback, comprising:
   receiver logic to receive an image from an image capture device;
   evaluation logic, coupled to the receiver logic, to process the image to generate a model representative of the image, the model comprising a plurality of features at a plurality of locations in the image and to generate a score for the image by applying a scoring metric to the model;
   recommendation logic, coupled to the evaluation logic, to generate a recommendation for an action, such that if the image capture device captures a second image after the action is performed, the score for the second image will be better than the score for the image; and
   indicator logic, coupled to the recommendation logic and to an output device, to indicate the recommendation for the action on the output device;
   wherein the image capture device is a depth camera and wherein the plurality of features at a plurality of locations comprises features located at different depths in the image.

2. The system of claim 1, wherein the depth camera comprises a heterogeneous camera array.

3. The system of claim 1, wherein the evaluation logic is to generate a local background salience for each feature, and wherein the score for the image is based at least in part on at least one local background salience.

4. The system of claim 1, wherein the evaluation logic is to perform a color complementarity analysis between a local area of each feature and a local background area of each feature, and wherein the score for the image is based at least in part on at least one color complementarity.

5. The system of claim 1, wherein the plurality of features includes a face or a body identified in the image.

6. The system of claim 1, wherein the image capture device is a depth camera and wherein the plurality of features comprises centers-of-mass of regions at a plurality of depths in the image.

7. The system of claim 1, wherein the evaluation logic is to compare the image to one or more composition templates, and wherein the score for the image is based at least in part on the comparison.

8. The system of claim 7, wherein the score for the image is based at least in part on the comparison between the image and the composition template most similar to the image.

9. The system of claim 7, wherein the one or more composition templates comprise a user-selected composition template.

10. A system for image capture feedback, comprising:
    receiver logic to receive an image from an image capture device;
    evaluation logic, coupled to the receiver logic, to process the image to generate a model representative of the image, the model comprising a plurality of features at a plurality of locations in the image and to apply a scoring metric to the model to generate a score for the image;
    recommendation logic, coupled to the evaluation logic, to generate a recommendation for an action, such that if the image capture device captures a second image after the action is performed, the score for the second image will be better than the score for the image; and indicator coupled to the recommendation logic and to an output device, to indicate the recommendation for the action on the output device; wherein the recommendation logic comprises:

candidate logic, coupled to the evaluation logic, to generate a target model having a better score than the score for the image; and action logic, coupled to the candidate logic, to generate the action based on a difference between the model and the target model.

11. The system of claim 10, wherein the output device is a display device, and wherein the indicator logic is to indicate the recommendation for the action by displaying an outline of an object in a display of the image in a location that the object would occupy if the action were performed.

12. The system of claim 10, wherein the output device is a display device, and wherein the indicator logic is to indicate the recommendation for the action by displaying a motion trail proximate to an object in a display of the image, the motion trail indicative of movement toward a location that the object would occupy if the action were performed.

13. The system of claim 10, wherein the output device is a display device, and wherein the indicator logic is to indicate the recommendation for the action by displaying an indicator at an edge of the display, the edge selected to correspond to a direction that the image capture device would move if the action were performed.

14. A method for image capture feedback implemented by a computing device, comprising:

by the computing device, receiving an image from an image capture device;

by the computing device, processing the image to generate a model representative of the image, the model comprising a plurality of features at a plurality of locations in the image, and applying a scoring metric to the model to generate a score for the image;

by the computing device, generating a recommendation for an action, such that if the image capture device captures a second image after the action is performed, the score for the second image will be better than the score for the image; and by the computing device, indicating the recommendation for the action on an output device;

wherein the image capture device comprises a depth camera and wherein the plurality of features at a plurality of locations comprises features located at different depths in the image.

15. One or more non-transitory computer readable media having instructions thereon that, when executed by one or more processing devices of a computing device, cause the computing device to:

receive an image from an image capture device;

process the image to generate a model representative of the image, the model comprising a plurality of features at a plurality of locations in the image, and apply a scoring metric to the model to generate a score for the image;

generate a recommendation for an action, such that if the image capture device captures a second image after the action is performed, the score for the second image will be better than the score for the image; and indicate the recommendation for the action on an output device;

wherein the image capture device comprises depth camera and wherein the plurality of features at a plurality of locations comprises features located at different depths in the image.

16. The one or more non-transitory computer readable media of claim 15, wherein the depth camera comprises a heterogeneous camera array.

17. One or more non-transitory computer readable media having instructions thereon that, when executed by one or more processing devices of a computing device, cause the computing device to:

receive an image from an image capture device generate a score for the image;

generate a recommendation for an action, such that if the image capture device captures a second image after the action is performed the score for the second image will be better than the score for the image; and indicate the recommendation for the action on an output device wherein generate a recommendation for an action comprises:

identify a target model having a better score than the score for the image;

identify a difference between the model and the target model; and generate a recommendation for an action based on the identified difference between the model and the target model.

18. The one or more non-transitory computer readable media of claim 17, wherein the output device is a display device, and indicate the recommendation for the action comprises:

display an outline of an object in a display of the image in a location that the object would occupy if the action were performed.

19. The one or more non-transitory computer readable media of claim 17, wherein the output device is a display device, and indicate the recommendation for the action comprises:

display a motion trail proximate to an object in a display of the image, the motion trail indicative of movement toward a location that the object would occupy if the action were performed.

20. The one or more non-transitory computer readable media of claim 17, wherein the output device is a display device, and indicate the recommendation for the action comprises:

display an indicator at an edge of the display, the edge selected to correspond to a direction that the image capture device would move if the action were performed.

* * * * *